United States Patent
Nguyen et al.

(10) Patent No.: US 12,374,720 B2
(45) Date of Patent: Jul. 29, 2025

(54) PROCESS FOR PREPARING A SOLID ELECTROLYTE BASED ON POLYCARBONATES AND A COMPOSITE ELECTRODE COMPRISING SUCH A SOLID ELECTROLYTE

(71) Applicant: COMMISSARIAT A L'ENERGIE ATOMIQUE ET AUX ENERGIES ALTERNATIVES, Paris (FR)

(72) Inventors: Huu-Dat Nguyen, Grenoble (FR); Lionel Picard, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 542 days.

(21) Appl. No.: 17/806,428

(22) Filed: Jun. 10, 2022

(65) Prior Publication Data

US 2022/0416298 A1 Dec. 29, 2022

(30) Foreign Application Priority Data

Jun. 10, 2021 (FR) .................................. 21 06117

(51) Int. Cl.
*H01M 10/0565* (2010.01)
*C08G 64/30* (2006.01)
(Continued)

(52) U.S. Cl.
CPC ........ *H01M 10/0565* (2013.01); *C08G 64/30* (2013.01); *H01M 4/0404* (2013.01);
(Continued)

(58) Field of Classification Search
None
See application file for complete search history.

(56) References Cited

U.S. PATENT DOCUMENTS

2021/0005928 A1  1/2021 Lassagne et al.
2022/0328873 A1* 10/2022 Cui ................... H01M 10/0565

FOREIGN PATENT DOCUMENTS

EP      3 761 398 A1    1/2021
WO      WO2014042391  *  3/2014
WO      WO 2018/158545 A1  9/2018

OTHER PUBLICATIONS

U.S. Appl. No. 17/654,089, filed Mar. 9, 2022, Nguyen, et al.
(Continued)

*Primary Examiner* — Wyatt P McConnell
(74) *Attorney, Agent, or Firm* — Oblon, McClelland, Maier & Neustadt, L.L.P.

(57) ABSTRACT

A process for preparing a solid electrolyte or a composite electrode incorporating a solid electrolyte, configured for an electrochemical system, may involve: (i) synthesizing, in a solvent medium, at least one (co)polymer by ring-opening (co)polymerization (ROP) of at least one 5-8-membered cyclic carbonate and, optionally, of at least one 5-8-membered lactone, catalyzed by Brønsted superacid(s) and initiated by compound(s) comprising hydroxide group(s); (ii) adding to the reaction medium a sufficient amount of an alkali metal or alkaline earth metal hydride, e.g., LiH, to neutralize all the catalyst and obtain an alkali metal or alkaline earth metal salt and to protect the terminal hydroxyl group(s) of the (co)polymer(s); (iii) optionally adding to the mixture from (ii) salt(s) of the alkali metal or alkaline earth metal, e.g., a lithium salt; and (iv) forming a solid electrolyte by evaporation of the solvent medium or a composite electrode incorporating the solid electrolyte.

20 Claims, 8 Drawing Sheets

(51) Int. Cl.
    *H01M 4/04*         (2006.01)
    *H01M 4/139*       (2010.01)
    *H01M 10/052*     (2010.01)

(52) U.S. Cl.
    CPC ......... *H01M 4/139* (2013.01); *H01M 10/052* (2013.01); *H01M 2300/0082* (2013.01)

(56) References Cited

OTHER PUBLICATIONS

French Preliminary Search Report Issued Mar. 10, 2022 in French Application 21 06117 filed on Jun. 10, 2021 (with English Translation of Categories of Cited Documents & Written Opinion), therein, 9 pages.

Tominaga et al., "Alternating copolymers of carbon dioxide with glycidyl ethers for novel ion-conductive polymer electrolytes", Polymer 51, ScienceDirect, 2010, 4 pages.

Wang et al., "Carbon Dioxide-Based Functional Polycarbonates: Metal Catalyzed Copolymerization of $CO_2$ and Epoxides", Coordination Chemistry Reviews 372, 2018, 16 pages.

Kimura et al., "Electrochemical Properties of a Poly(Ethylene Carbonate)-LiTFSI Electrolyte Containing a Pyrrolidinium-Based Ionic Liquid", Ionics 21, 2015, 6 pages.

Sun et al., "Polycarbonate-Based Solid Polymer Electrolytes for Li-ion Batteries", Solid State Ionics 262, 2014, 5 pages.

Mindermark et al., "Copolymers of Trimethylene Carbonate and ε-Caprolactone as Electrolytes for Lithium-ion Batteries" Polymer 63, ScienceDirect, 2015, 8 pages.

Meabe et al., "Polycondensation as a Versatile Synthetic Route to Aliphatic Polycarbonates for Solid Polymer Electrolytes", Electrochimica Acta 237, 2017, 8 pages.

Zhao et al., "Triflimide ($HNTf_2$) in Organic Synthesis", Chem. Rev. 118, 2018, 44 pages.

Singh et al., "Advances in Chemistry of Hydrogen Bis(fluorosulfonyl)imide and its Derivatives", Journal of Fluorine Chemistry 226, 2019, 12 pages.

Gazeau-Bureau et al., "Organo-Catalyzed ROP of E-Caprolactone: Methanesulfonic Acid Competes with Trifluoromethanesulfonic Acid", Macromolecules 41, 2008, 3 pages.

Kakuchi et al., "Controlled/Living Ring-Opening Polymerization of δ-Valerolactone Using Triflylimide as an Efficient Cationic Organocatalyst", Macromolecules vol. 43, No. 17, 2010, 5 pages.

Makiguchi et al., "Synthesis of Block and End-Functionalized Polyesters by Triflimide-Catalyzed Ring-Opening Polymerization of e-Caprolactone, 1,5-Dioxepan-2-one, and rac-Lactide", Journal of Polymer Science, Part A: Polymer Chemistry 51, 2013, 9 pages.

Tominaga et al., "An end-capped poly(ethylene carbonate)-based concentrated electrolyte for stable cyclability of lithium battery", Electrochimica Acta, ScienceDirect, 2019, 5 pages.

Kütt et al., "Equilibrium Acidities of Superacids", J. Org. Chem. vol. 76, 2011, 5 pages.

Tundo et al., "Synthesis of Dialkyl Ethers by Decarboxylation of Dialkyl Carbonates", Green Chemistry, The Royal Society of Chemistry 10, 2008, 8 pages.

\* cited by examiner

[Fig 1]
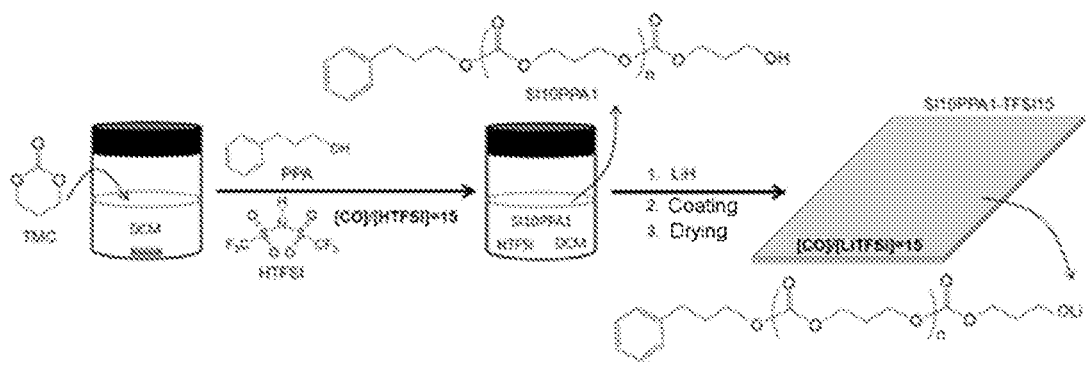
[Fig 2]
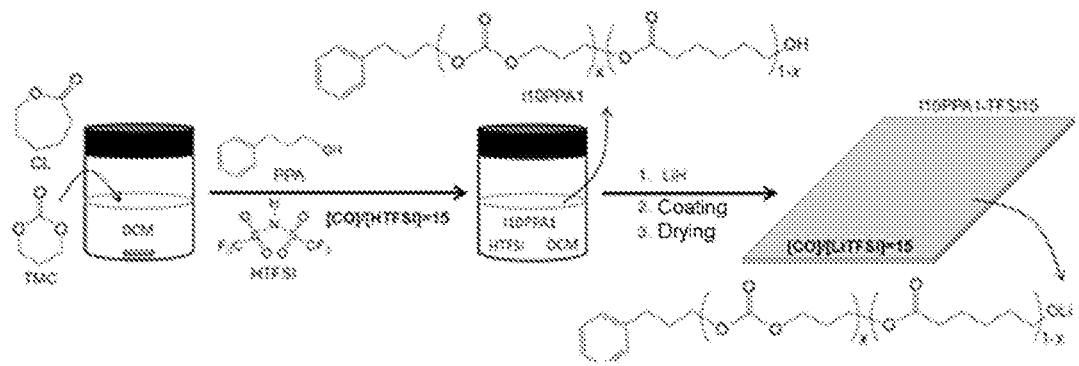
[Fig 3]
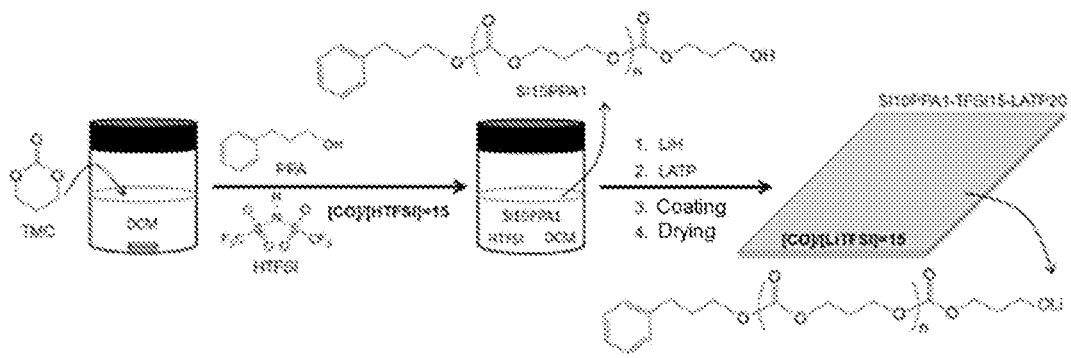

[Fig 4]
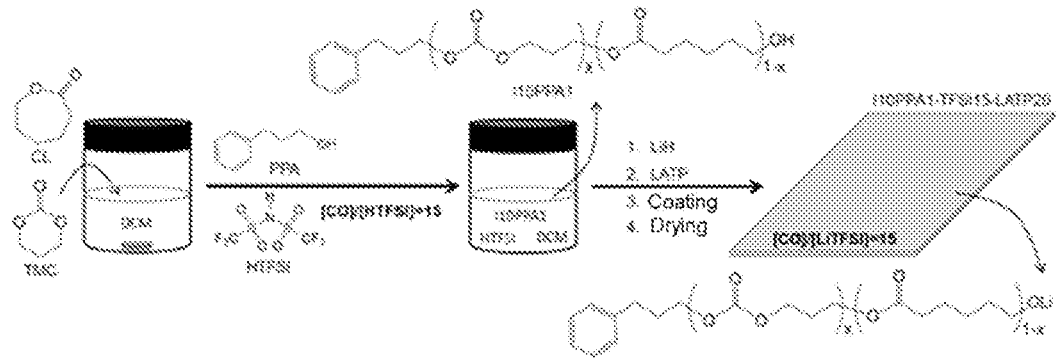
[Fig 5]
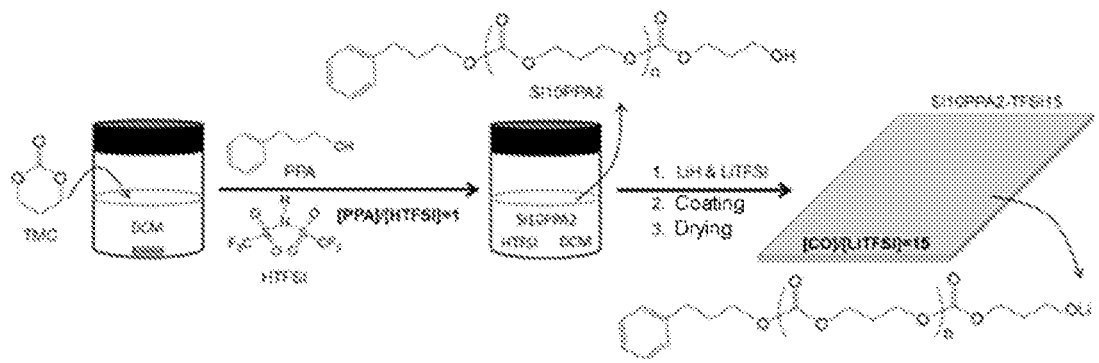
[Fig 6]
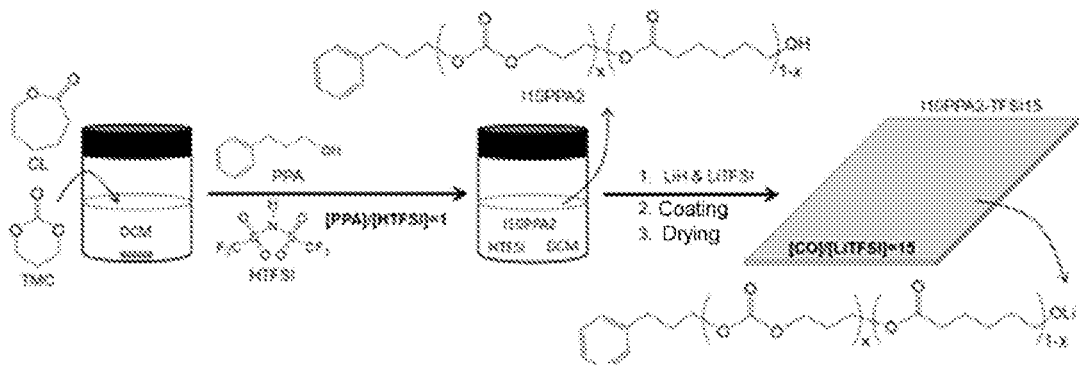

[Fig 7]
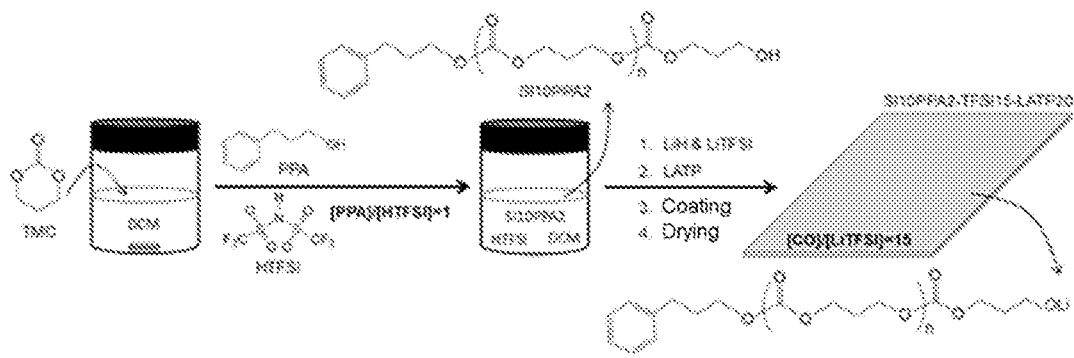
[Fig 8]
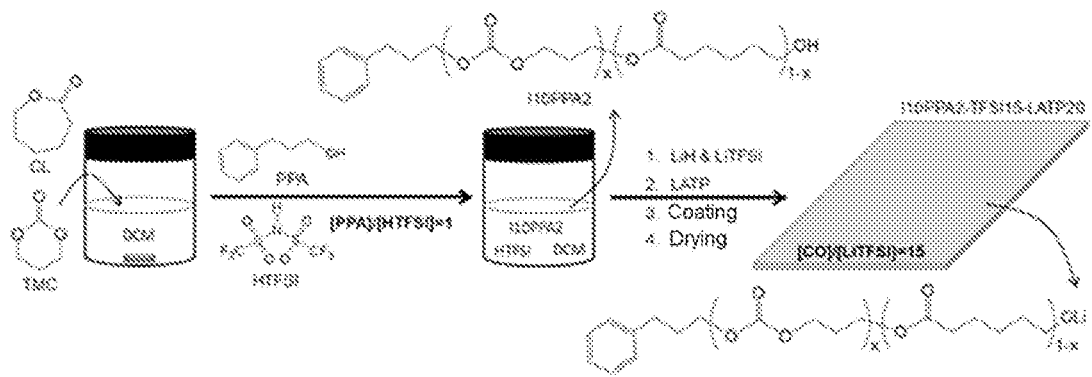
[Fig 9]
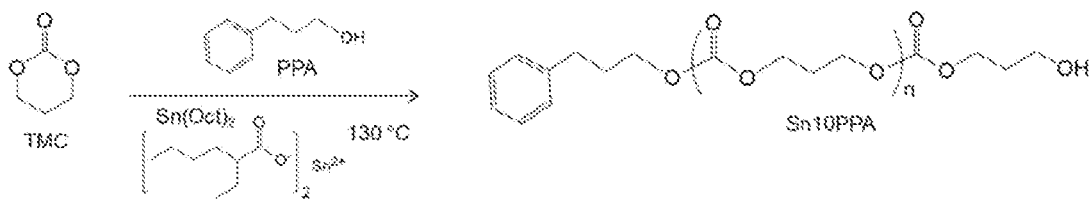

[Fig 10]
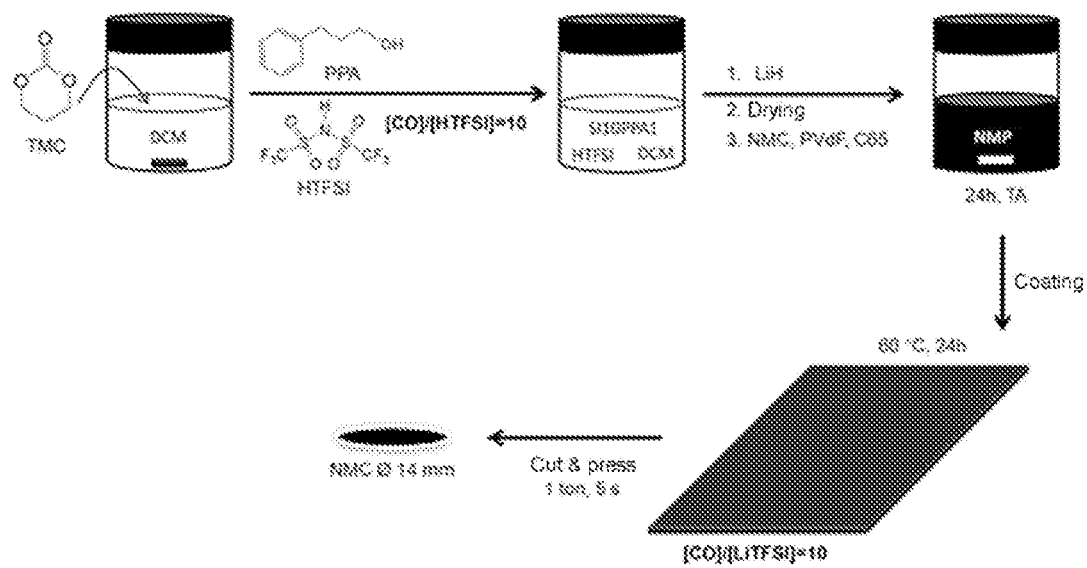
[Fig 11]
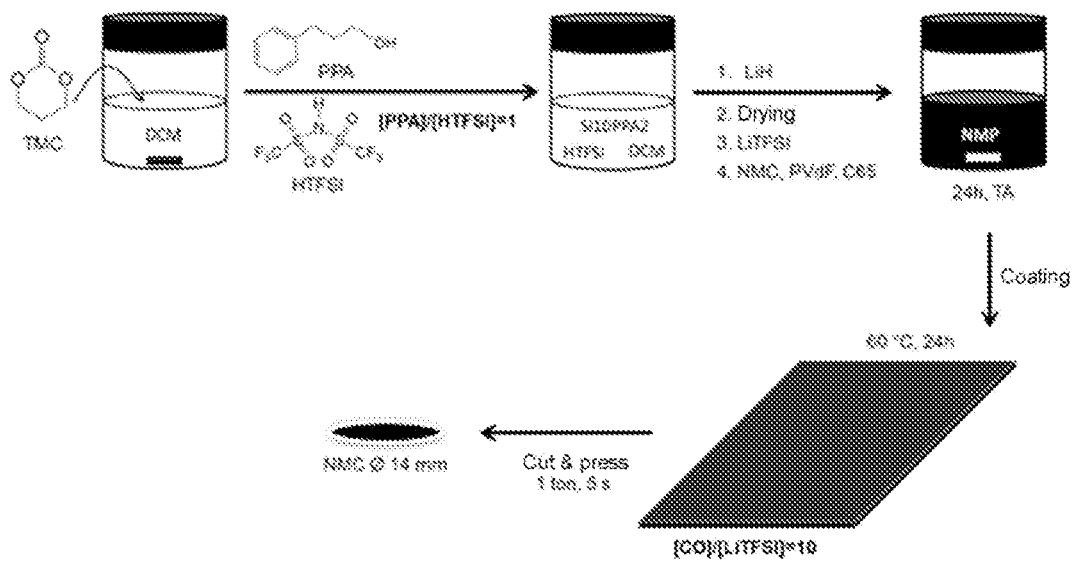

[Fig 12]
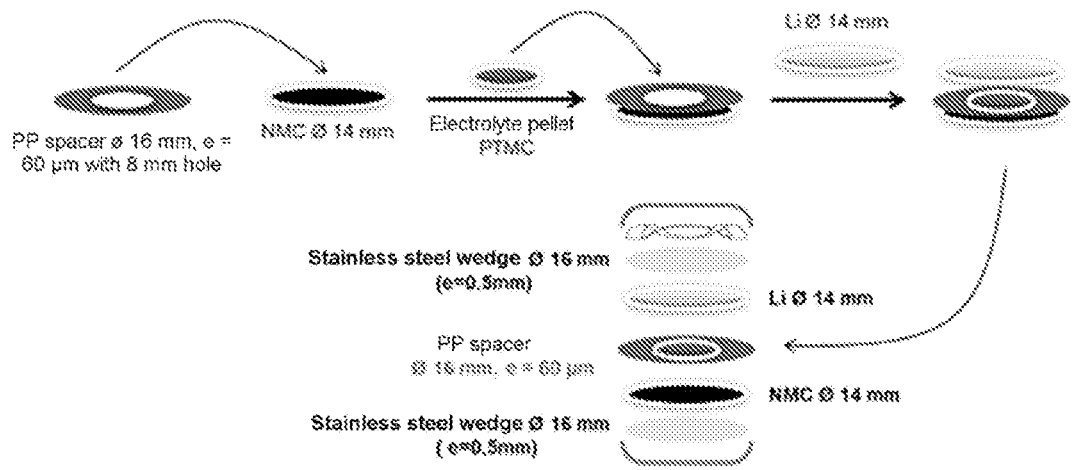
[Fig 13]
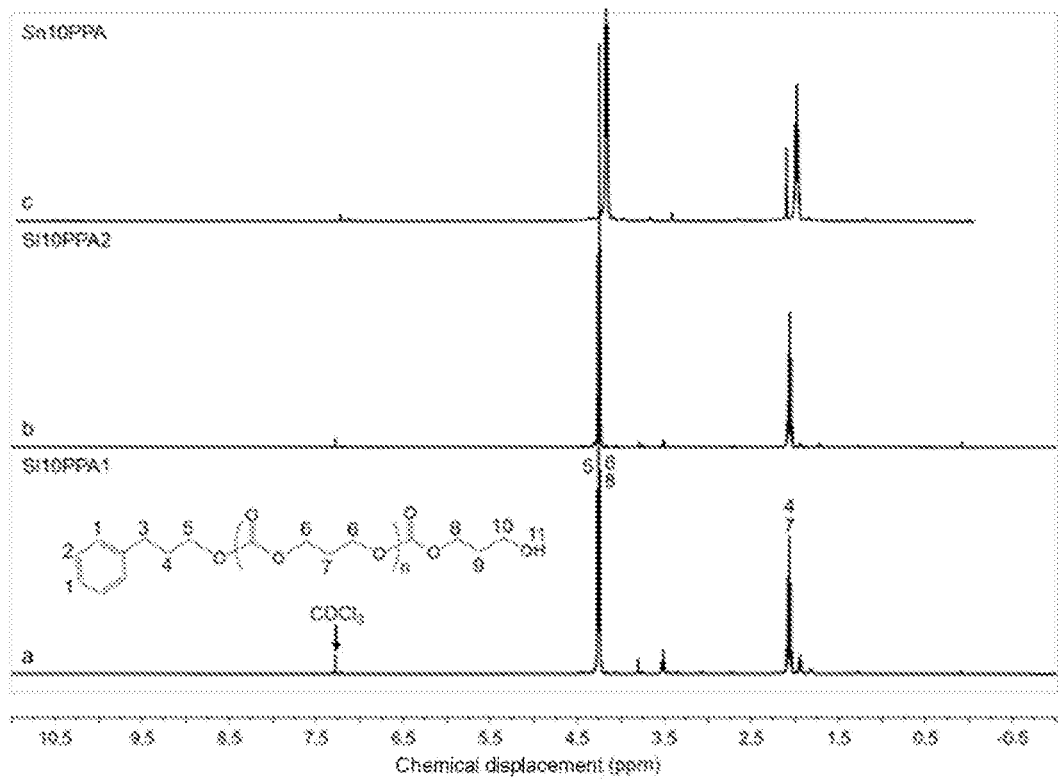

[Fig 14]
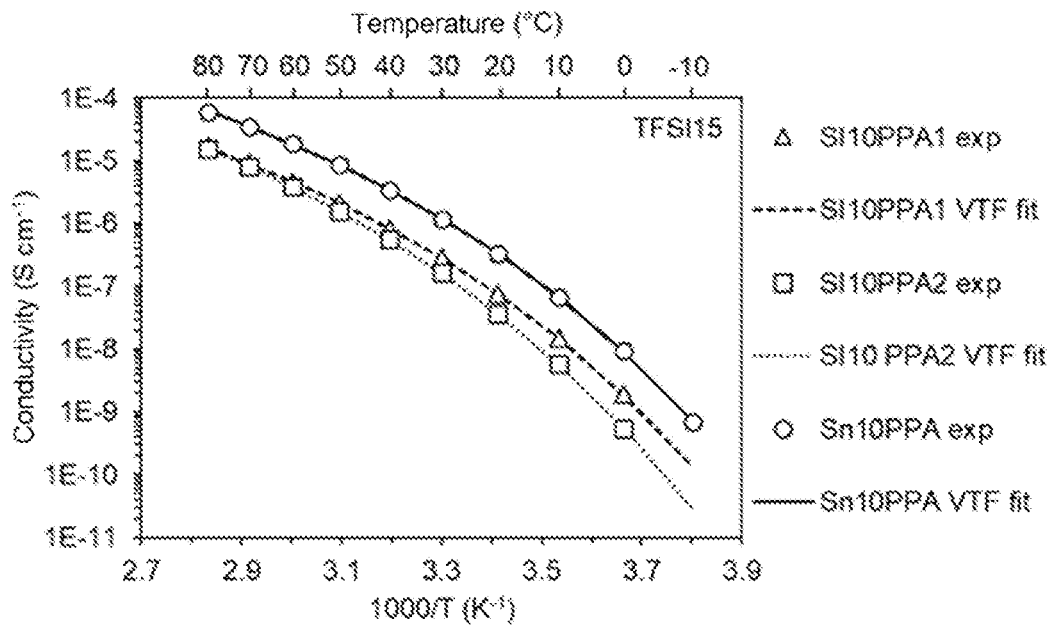
[Fig 15]
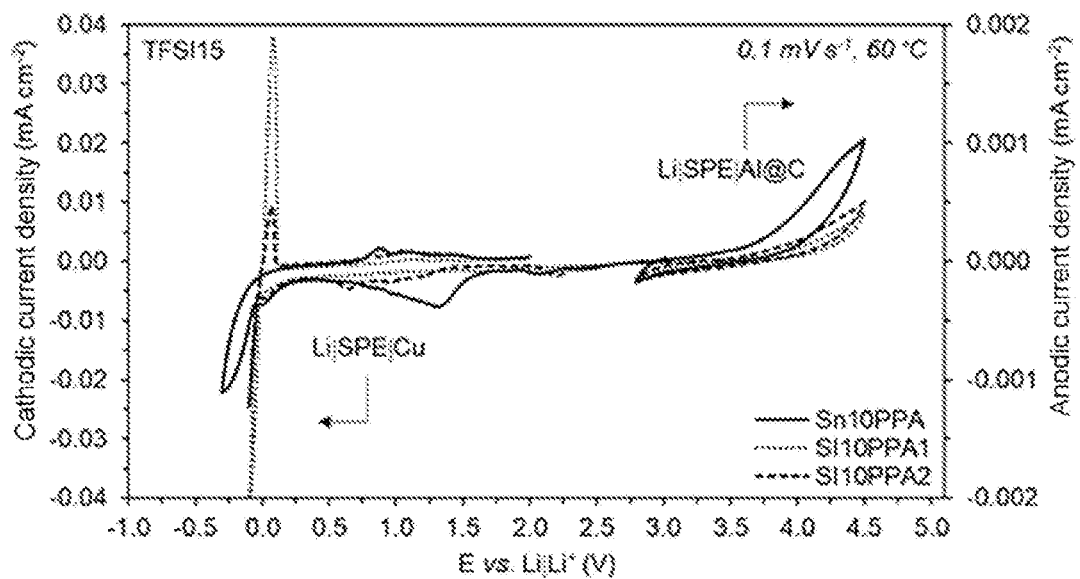

[Fig 16]
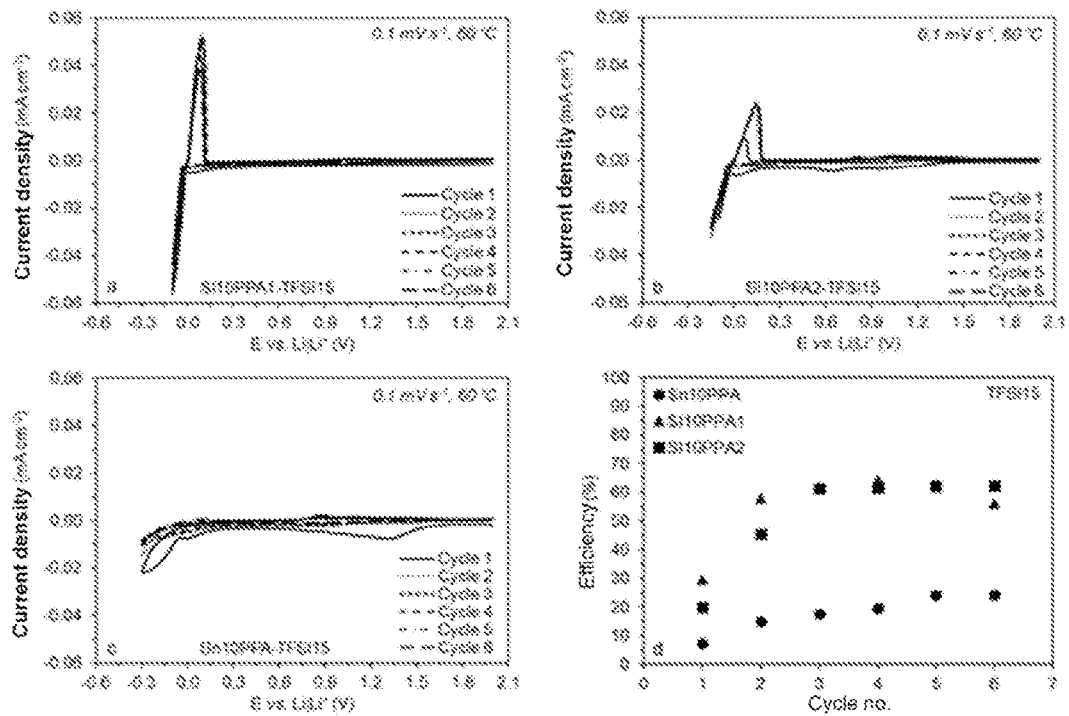
[Fig 17]
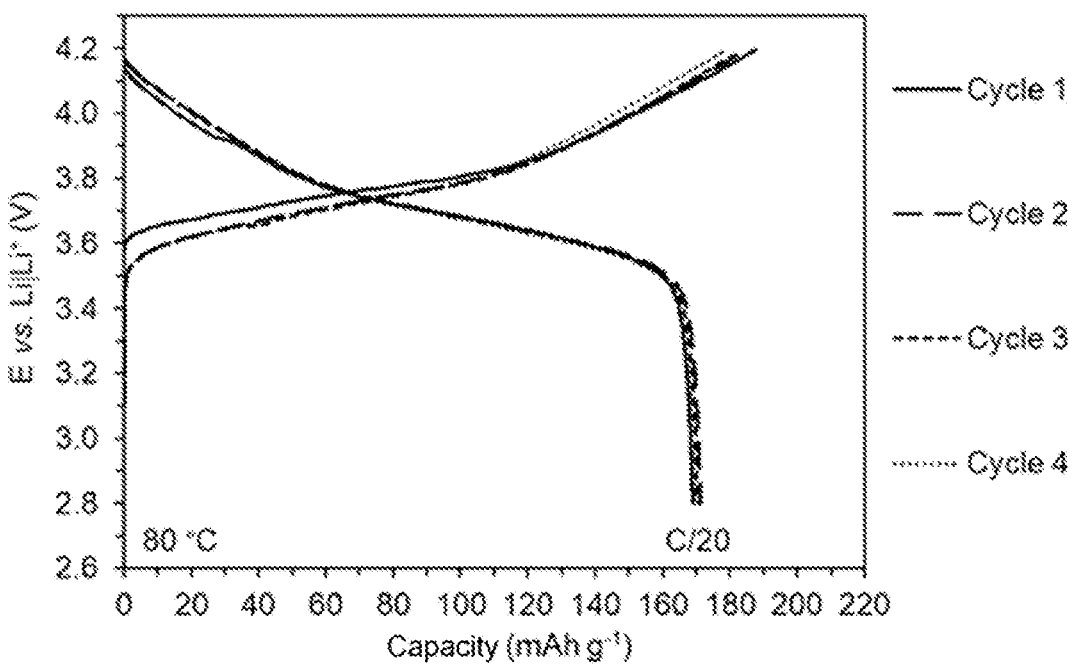

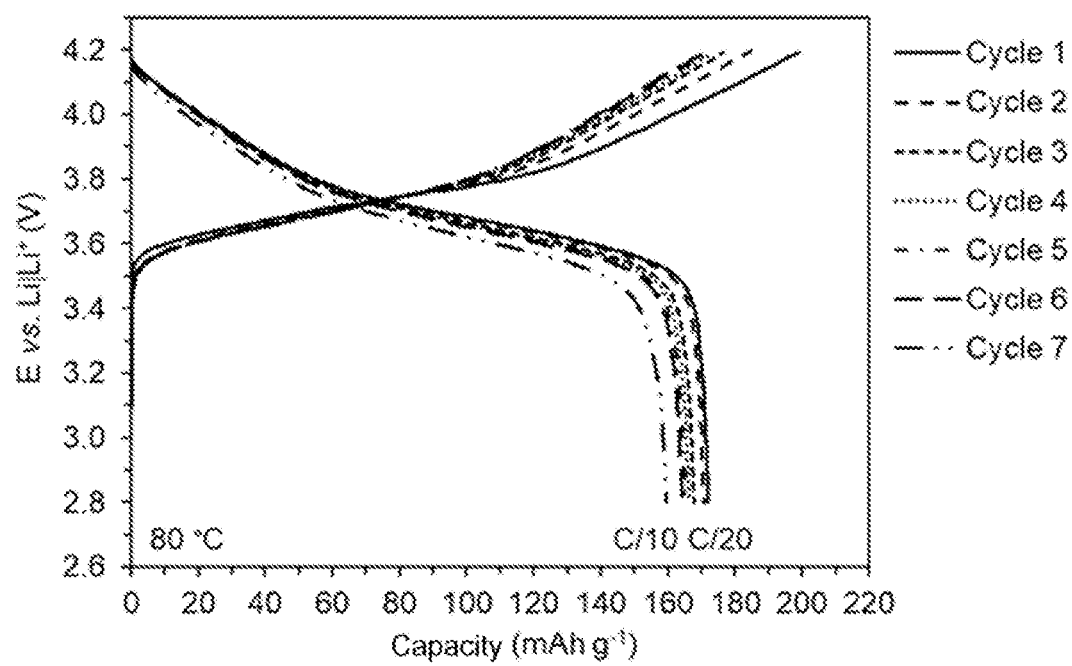
[Fig 18]

PROCESS FOR PREPARING A SOLID ELECTROLYTE BASED ON POLYCARBONATES AND A COMPOSITE ELECTRODE COMPRISING SUCH A SOLID ELECTROLYTE

CROSS-REFERENCE TO RELATED APPLICATIONS

The present application claims the benefit of the filing date of French Appl. No. 21 06117, filed on Jun. 10, 2021, the content of which is incorporated by reference.

TECHNICAL FIELD

The present invention relates to a novel method of preparing solid electrolytes for electrochemical devices, in particular for rechargeable batteries, for example lithium batteries. The preparation of solid electrolytes based on aliphatic polycarbonates according to the invention implements the synthesis of polycarbonates, in particular poly(trimethylene carbonate) (PTMC) or copolymers thereof with ε-caprolactone (PTMC-PCL) by ring-opening (co)polymerization (ROP), catalyzed by a Brønsted superacid, for example bis(trifluoromethanesulfonyl)imide acid (HTFSI) or trifluoromethanesulfonic acid (TfOH), followed by the conversion, directly at the level of the synthesis reaction medium, of the Brønsted superacid into an alkali metal or alkaline earth metal salt by neutralization with a metal hydride, in particular lithium hydride.

The process of the invention may more particularly be used in order to form a solid electrolyte membrane, particularly of the solid polymer electrolyte (SPE) or hybrid solid electrolyte (HSE) type, or a composite electrode comprising a solid electrolyte.

PRIOR ART

Conventionally, the principle of functioning of an electrochemical generator is based on the insertion and withdrawal, also referred to as "disinsertion," of an alkali metal ion or a proton into and from the positive electrode, and the deposition or extraction of the ion onto and from the negative electrode.

The main systems use the cation lithium as a transport ion species. In the case of a lithium accumulator, for example, the cation lithium extracted from the positive electrode during charging of the battery is deposited on the negative electrode and, conversely, it is extracted from the negative electrode so as to be intercalated in the positive electrode at the time of discharge.

The transport of the alkali metal or alkaline earth metal proton or cation, in particular the cation lithium, between the positive electrode and the negative electrode is carried out by an electrolyte ion conductor.

The formulation of the electrolyte used is of essential importance for the performance of the electrochemical system, in particular when it is used at very low or very high temperatures. The ion conductivity of the electrolyte determines in particular the efficacy of the electrochemical system, in view of the fact that it plays a role in mobility of the ions between the positive and negative electrode. Other parameters also play a role in the choice of the electrolyte used. These are in particular its thermal, chemical, or electrochemical stability in the electrochemical system, as well as economic, security, and environmental protection criteria, including in particular the toxicity of the electrolyte.

Lithium batteries, using solid-state electrolytes (also referred to as "SSE," for the English acronym "solid-state electrolyte"), are considered to be the next generation of energy storage devices, making it possible to achieve higher energy densities and increased security due to the absence of a solvent. SSEs may be classified into three categories: inorganic solid electrolytes (also referred to as "ISEs" for "inorganic solid electrolytes"), solid polymer electrolytes (also referred to as "SPEs" for "solid polymer electrolytes") and hybrid solid electrolytes (also referred to as "HSEs" for "hybrid solid electrolytes"). Particular attention is paid to the SPEs and HSEs because of the increased flexibility of these electrolytes, which makes them suitable for the manufacture of batteries having reduced thickness and greater flexibility.

The most widely used SPEs and HSEs, particularly for lithium electrochemical devices, are based on polyethers, and more particularly polyoxyethylene (POE) and derivatives thereof, because of their low gas transition temperature (Tg), on the order of −60° C., in comparison to other polymers, and their capacity to complex $Li^+$ cations. Nevertheless, these electrolytes show limited performance with respect to ion transport number ($t_+$) and ion conductivity connected with the ion complexing mechanism. Thus, for a solid polymer electrolyte based on POE, for example, the ion transport number $t_+$ is generally on the order of 0.1 to 0.3. In addition, POE is highly crystalline (the crystallinity of pure POE is on the order of 75-80% at ambient temperature), which leads to a loss of ion conductivity of the solid electrolyte based on POE below its fusion temperature (approximately 60-65° C.). Most SPEs based on POE are also associated with complex phase diagrams, with multiple phases shown in broad temperature intervals, which makes conductivity behavior unpredictable. The mechanical stability of POE is also insufficient at high temperatures (greater than 60° C.), at which it shows favorable ion conductivity. Moreover, POE has a low electrochemical stability window (<3.9 V vs. $Li/Li^+$), which makes this type of SPEs suitable only for use with low potential cathodes, such as the $LiFePO_4$ (LFP) type, for example.

In fact, numerous alternative polymers have been developed in recent years, such as for example polycarbonates, polyesters, poly(arylene ether sulfone)s, polynitriles, polyalcohols and polyamines, etc. Among these, the aliphatic polycarbonates, in particular poly(trimethylene carbonate) (PTMC) and its copolymers, have appeared as alterative host materials to POE, of particular interest for forming solid polymer electrolytes, because of their strongly amorphous structure, the flexibility of their chain segments, their high dielectric constant, their low toxicity and their favorable mechanical properties. It has thus been shown that PTMC, and its copolymers with ε-caprolactone (CL), make it possible to achieve improved performance in comparison to POE in terms of the ion conductivity of the solid electrolyte material at ambient temperature, its wide window of electrochemical stability (up to 5.0 V vs. $Li/Li^+$), its ion transport number ($t_+>0.5$) or its thermal stability, which makes these polymer materials particularly promising for forming the new generation of SPEs.

Currently, the majority of aliphatic polycarbonates proposed for applications such as solid polymer electrolytes, for example in rechargeable lithium batteries, are obtained by two different synthesis routes: on the one hand, by copolymerization between $CO_2$ and epoxides, and on the other, by ring-opening polymerization of cyclic carbonates catalyzed by stannous octanoate ($Sn(Oct)_2$).

With regard to the first synthesis route, Tominaga et al. [1] first described the synthesis of poly(ethylene carbonate) (PEC) via copolymerization of $CO_2$ and epoxy monomers using zinc glutarate as a catalyst. Four types of PEC having phenyl, n-butyl, t-butyl or methoxyethyl side groups are synthesized and used in order to form membranes of solid polymer electrolyte comprising 10% mol. of lithium bis(trifluoroethylsulfonylimide) (LiTFSI). The conductivity tests show that the electrolyte based on PEC having methoxyethyl side shows the highest conductivity, on the order of $10^{-6}$ S·cm$^{-1}$ at ambient temperature.

Unfortunately, this synthesis route does not allow satisfactory control of the polymers formed because of the various secondary reactions that can occur during their synthesis, such that the formation of ether bonds due to consecutive ring opening of epoxides or the production of cyclic carbonates by a competitive reaction referred to as "chain transfer" (or "backbiting" in English) [2]. Thus, this synthesis route has been found to be more attractive for applications in the area of green chemistry and biomaterials than in that of rechargeable batteries, for which the window of electrochemical stability of polymer electrolytes is highly sensitive to defects in the chemical structure of the polymer. Moreover, in publication [3], Kimura et al. report that the hybrid solid electrolytes based on poly(ethylene carbonate), LiTFSI and an ionic liquid based on pyrrolidinium make it possible to achieve stability of only up to 4.3 V vs. Li$^+$/Li. In addition, continuous cathode scanning only allows the identification of a few peaks characteristic of the insertion/disinsertion of Li$^+$ ions and shows only poor stability in reduction with respect to a lithium anode.

Concerning the second synthesis route, Brandell et al. ([4]) describe the synthesis of poly(trimethylene carbonate) of high molecular mass (368,000 g·mol$^{-1}$) by mass polymerization by ring opening catalyzed by stannous octanoate (Sn(Oct)$_2$) in order to form solid polymer electrolytes in lithium batteries. The polymer obtained is mixed with LiTFSI in solution and shaped in order to obtain flexible SPE films. The most conductive systems are achieved for molar ratios of carbonyl groups of the monomer units relative to lithium [CO]/[Li$^+$] of 13 and 8, with greater electrochemical stability of up to 5.0 V vs. Li/Li$^+$ than that obtained with POE, but ion conductivity os approximately $10^{-7}$ S·cm$^{-1}$ at 60° C., which is far from satisfactory for SPE application. Using the same synthesis route, Mindemark et al. [5] describe the synthesis of random copolymers of trimethylene carbonate (TMC) and ε-caprolactone (CL), with a molecular mass ranging from 457,000 to 508,000 g·mol$^{-1}$, for application as an SPE. The electrolyte membranes, formed from these copolymers in combination with a salt LiTFSI, show a reduction in gas transition temperature Tg and an increase in ion conductivity with an increasing content of CL. The electrolyte having the best performance is obtained for with a TMC:CL ratio of 60:40 and 28% by weight of LiTFSI and makes it possible to reach a Tg of −26° C. with conductivity of $1.6.10^{-5}$ S·cm$^{-1}$ at 60° C. ($7.9.10^{-7}$ S·cm$^{-1}$ at 25° C.) and a wide window of electrochemical stability. The electrolyte of optimal composition mentioned above is tested in a solid LiFePO$_4$ half-cell and has high coulombic capacity and efficacy for charging rates of up to C/5 inclusively. In the first cycles, the electrolyte based on said copolymer shows improved performance compared to electrolytes prepared from homo PTMC polymer, thus indicating better interfacial contact for the electrolyte incorporating CL as a comonomer.

Nevertheless, the synthesis route by ring-opening polymerization catalyzed by Sn(Oct)$_2$, as proposed by Brandell et al. and Mindemark et al. requires long reaction times (at least 72 hours) for high temperatures (≥130° C.), which does not allow their transposition to an industrial scale because of excessively high energy consumption. Moreover, the severe synthesis conditions at high temperatures do not allow the polymerization and polydispersity of the polymers obtained to be controlled. They therefore tend to induce defects in the chemical structure of the polymers obtained. Finally, the catalyst used, Sn(Oct)$_2$, cannot be totally eliminated from the final product because of its solubility, which is similar to that of the polymer synthesized in numerous organic solvents. For many applications of these polymers, for example as biomaterials, the residual presence of the catalyst in the polymer material formed is not a problem. Nevertheless, for applications connected with electrochemical processes, such as in rechargeable lithium batteries, the presence of the catalyst, and in particular metal cations such as Sn$^{2+}$, Zn$^{2+}$, etc., tends to have harmful effects on the performance and durability of the batteries, because these cations may also be reduced/oxidized during the charging/discharging process.

As a result, studies were conducted in order to develop alternative synthesis routes in order to obtain aliphatic polycarbonates suitable for use in rechargeable batteries. For example, Mecerreyes et al. [6] propose the synthesis of aliphatic polycarbonates having molecular mass of between 8,000 and 43,000 g·mol$^{-1}$ by polycondensation of dimethyl carbonate and aliphatic diols, catalyzed by 4-dimethylaminopyridine (DMAP). All of the aliphatic polycarbonates obtained are semi-crystalline, with melting temperatures ranging from 45 to 63° C. and gas transition temperatures of approximately −40° C. These polycarbonates were tested, in combination with the salt LiTFSI, for their efficacy as a matrix host in order to form SPEs. The highest ion conductivity of $1.10^{-4}$ S·cm$^{-1}$ at ambient temperature is achieved for poly(dodecamethylene carbonate) used in combination with 80% by mass of LiTFSI. Nevertheless, these aliphatic polycarbonates show a window of electrochemical stability of only up to 4 V, which is thus hardly better than that obtained with POE. This could be connected with the synthesis route of these polycarbonates, conducted at extremely high temperatures (180° C.) and elevated pressure, which tends to induce more defects in the chemical structure of these polymers.

Thus, despite the studies conducted in order to propose alternative synthesis routes, ring-opening polymerization catalyzed by Sn(Oct)$_2$ remains to date the preferred synthesis route for obtaining aliphatic polycarbonates for the purpose of forming solid electrolytes in rechargeable batteries, particularly in lithium batteries.

Regardless of the polycarbonate synthesis route used among the above methods, the formulation of electrolytes requires in all cases several steps of purification and washing of the polycarbonates obtained in order to remove the catalyst. Such steps unfortunately consume large amounts of organic solvent(s), consume energy and are costly in terms of time.

There thus remains a need to provide a novel synthesis route for solid electrolytes making it possible to eliminate the above-mentioned drawbacks and to obtained, in an easy and rapid manner, solid electrolytes suitable for use in electrochemical systems, in particular in lithium batteries.

The object of the present invention is precisely to meet this need.

SUMMARY OF THE INVENTION

The present invention relates to a process for preparing a solid electrolyte or a composite electrode intended for an electrochemical system, in particular with a rechargeable battery, particularly a lithium battery, comprising at least the following steps:

(i) synthesis, in a solvent medium, at least one (co)polymer by ring-opening (co)polymerization (ROP) of at least one five- to eight-membered cyclic carbonate and, optionally, of at least one five- to eight-membered lactone, said (co)polymerization reaction being catalyzed by at least one Brønsted superacid capable of forming, after neutralization in step (ii) of the process of the invention, an ion-conducting alkali metal or alkaline earth metal salt;

(ii) addition to the reaction medium obtained in step (i) of a sufficient amount of an alkali metal or alkaline earth metal hydride, in particular lithium hydride (LiH), in order to neutralize all of said catalyst and obtain an alkali metal or alkaline earth metal salt, and in order to protect said terminal hydroxyl group(s) of said synthesized (co)polymer(s);

(iii) addition or not to the mixture obtained in step (ii) of at least one salt of said alkali metal or alkaline earth metal, in particular a lithium salt; and (iv) formation of a solid electrolyte by evaporation of the solvent medium, or a composite electrode incorporating said solid electrolyte.

Preferably, Brønsted superacid used in step (i) of the process of the invention may be selected from bis(trifluoromethanesulfonyl)imide acid (HTFSI), trifluoromethanesulfonic acid (TfOH), bis(fluorosulfonyl)imide acid (HFSI), fluorosulfuric acid ($FSO_3H$) and mixtures thereof. The ion conductor salt formed in step (ii) of the process of the invention may thus for example be LiTFSI, LiTf, LiFSI and/or $FSO_3Li$.

As detailed below, other Brønsted superacids may also be used provided that they lead, by neutralization with an alkali metal or alkaline earth metal hydride, to an ion-conducting alkali metal or alkaline earth metal salt, for example a lithium ion-conducting salt. The term "aliphatic polycarbonate" or "polycarbonate" below will refer more simply to a (co)polymer obtained by (co)polymerization under the synthesis conditions according to the invention of at least one five- to eight-membered cyclic carbonate and, optionally, of at least one lactone.

Advantageously, said (co)polymer(s) are poly(trimethylene carbonates) (abbreviated PTMC below) or poly(trimethylene carbonate)-poly(ε-caprolactone) copolymers (abbreviated PTMC-PCL below), obtained by ring-opening polymerization of trimethylene carbonate (TMC), optionally by copolymerization with ε-caprolactone (CL).

The Brønsted superacids, such as bis(trifluoromethanesulfonyl)imide acid (HTFSI), also called triflimide acid and also abbreviated as "$HNTf_2$"; trifluoromethanesulfonic acid (HTFSA), also called triflic acid, and abbreviated as "TfOH"; bis(fluorosulfonyl)imide acid, also abbreviated as "HFSI," or fluorosulfuric acid ($FSO_3H$), abbreviated as "$FSO_3H$," have already been proposed as organic catalysts in various organic syntheses, because of their strong acidity and their favorable compatibility with organic solvents. The performance of HFTSI and HFSI also derives from the weak nucleophilicity and the non-coordination property of the $TFSI^-$ counter-anion (also abbreviated $Tf_2N^-$) or $FSI^-$ ([7], [8]).

The Brønsted superacids, in particular HTFSI and TfOH, have thus been reported as catalysts for ring-opening polymerization of ε-caprolactone, δ-valerolactone, 1,5-dioxepan-2-one and rac-lactide ([9], [10] and [11]).

Nevertheless, in these publications, the Brønsted superacids are used only as catalysts and are thus eliminated after synthesis by purification steps.

Moreover, these studies, relating to the use of Brønsted superacids as catalysts for ring-opening polymerization, deal with the use of polymers obtained for applications such as bio-materials, for example in the fields of tissue engineering, drug administration, etc. because of the favorable biocompatibility and biodegradability of these polymer materials.

To the knowledge of inventors, it has never been proposed to take advantage of this synthesis route for the preparation of aliphatic polycarbonates and their co-polymers, in order to form solid electrolytes, in particular in rechargeable lithium batteries.

Advantageously, the process for preparing solid electrolytes according to the invention takes advantage of the presence of the Brønsted superacid type catalyst, for example of HTFSI or TfOH, in the reaction medium for polycarbonate synthesis, in order to directly formulate, by transforming said catalyst in an alkali metal or alkaline earth metal salt by neutralization with a metal hydride, in particular lithium hydride, a mixture allowing direct access to a solid electrolyte, without requiring the intermediate step of purification of the polycarbonates.

Thus, the process of the invention advantageously makes it possible to dispense with all steps of purification of the synthesized polycarbonates and elimination of the catalyst, such as steps of polymer precipitation, filtration, etc. In fact, the catalyst is directly converted, in the reaction medium for synthesis of the aliphatic polycarbonates, into an ion-conducting salt.

In addition, in an advantageous manner, the hydroxyl groups at the chain terminals, also referred to as "terminal groups," of the polycarbonates synthesized according to the invention are protected while generating alkali metal or alkaline earth metal alkoxide groups, in particular lithium alkoxide, directly by adding an excess in step (ii) of the alkali metal or alkaline earth metal hydride, in particular lithium hydride.

Compared to the known methods of preparation of solid electrolytes based on polycarbonates, the process of the invention, not comprising intermediate purification steps, consumes less organic solvent and energy, and allows the electrolytes to be obtained more rapidly. The process of the invention is thus advantageously suitable for large-scale use industry.

Also, the process of the invention makes it possible to obtain solid electrolytes having good performance, in particular in terms of ion conductivity and electrochemical stability, equivalent or even superior to those obtained with electrolytes prepared from polycarbonates obtained by other synthesis routes, for example as described above.

Advantageously, the synthesis conducted under the specific conditions according to the invention makes it possible to access polycarbonates, in particular PTMCs and PTMC-PCLs, having weaker polydispersity compared to synthesis using the catalyst $Sn(Oct)_2$.

Advantageously, the synthesis process according to the invention makes it possible to access polycarbonates having controlled mass and polydispersity.

In particular, the polycarbonates synthesized according to the invention may have a number average molecular mass, Mn, of less than or equal to 200,000 g·mol$^{-1}$, in particular between 5,000 and 100,000 g·mol$^{-1}$ and more particularly between 5,000 and 50,000 g·mol$^{-1}$. They may advantageously have a low polydispersity (or polydispersity index), in particular less than or equal to 2.5, particularly less than or equal to 2.0.

In addition, the polycarbonate synthesis in step (i) of the process of the invention may be carried out at ambient temperature and is found, in this case as well, to be particularly advantageous in terms of energy consumption. Also, the polycarbonates may be advantageously obtained for short durations of polymerization, in particular for a duration of polymerization of less than 3 days, in particular less than or equal to 72 hours, particularly less than or equal to 48 hours.

Advantageously, the conversion of the catalyst, having been used for polycarbonate synthesis, directly into an alkali metal or alkaline earth metal salt, in particular lithium salt, makes it possible to ensure the absence of any traces of catalyst in the final electrolyte, and thus to obtain solid electrolytes of increased purity.

As illustrated in the following examples, the solid electrolytes obtained according to the invention based on polycarbonates, in particular of the type PTMC or PTMC-PCL, lead to a lithium battery having excellent performance, in particular elevated ion conductivity, for example greater than or equal to $10^{-5}$ S·cm$^{-1}$ at 60° C., in particular greater than or equal to $10^{-6}$ S·cm$^{-1}$ for a PTMC and greater than or equal to $10^{-5}$ S·cm$^{-1}$ for a PTMC-PCL at 60° C.; and lithium ion transport number, abbreviated $t_+$, greater than or equal to 0.50 at 60° C., in particular greater than or equal to 0.70 for PTMC and greater than or equal to 0.60 for PTMC-PCL at 60° C.

The solid electrolytes prepared according to the invention also show a favorable mechanical strength, high thermal stability (which guarantees the security of the energy storage devices comprising them) and improved potential stability.

In particular, they show a wide window of electrochemical stability, in particular up to 4.50 V vs. Li/Li$^+$. Thus, a solid electrolyte obtained according to the invention, based on polycarbonates, in particular based on PTMC or PTMC-PCL, can advantageously be used in batteries with high energy density, in combination with positive electrodes referred to as having "high" potential, i.e. functioning at a potential difference of greater than 4 V vs. Li/Li$^+$, in particular greater than or equal to 4.2 V vs. Li/Li$^+$, such as Li$^0$ batteries vs. LiNi$_{0.6}$Mn$_{0.2}$Co$_{0.2}$O$_2$ batteries, without affecting the thermal and electrochemical stability of the electrolyte.

An electrochemical system, in particular a lithium battery, comprising a separating membrane of solid electrolyte prepared according to the invention, can also function over a broad range of temperatures, preferably between −20° C. and 90° C., in particular between −10° C. and 80° C.

As detailed below, the process of the invention may more particularly be used in order to form a solid electrolyte, particularly in the form of a solid electrolyte film or membrane, in particular of the solid polymer electrolyte (SPE) or hybrid solid electrolyte (HSE) type; or in order to form a solid electrolyte at the level of a composite electrode.

The term "solid electrolyte film or membrane," refers to an electrolyte film or membrane excluding the presence of a component in liquid form, and capable of serving simultaneously as a separator and an ion conductor in an electrochemical system.

The process of the invention can thus comprise, depending on the intended purpose of the solid electrolyte, one or more intermediate steps, prior to the evaporation of the solvent medium, of addition, to the mixture obtained in step (ii) or (iii) according to the invention, of one or more compounds included in the composition of the solid electrolyte or the composite electrode comprising a solid electrolyte according to the invention.

More particularly, in the case of the preparation of a solid electrolyte, in particular in the form of a film, of the HSE type, the mixture obtained in step (ii) or (iii) may be supplemented by at least one inorganic filler conductive of (an) alkali or alkaline earth metal cation(s), in particular an inorganic filler conductive of lithium ions.

According to another variant embodiment, in the case of use of the process of the invention in order to form a composite electrode comprising a solid electrolyte, the mixture obtained in step (ii) or (iii) may be supplemented by one or more active electrode materials and, optionally, one or more conductive additives and/or one or more binders.

The invention relates, according to another of its aspects, to a solid electrolyte, in particular in the form of a solid electrolyte film, particularly of the SPE or HSE type, as obtained according to the process of the invention.

It also relates to a composite electrode comprising a solid electrolyte as obtained according to the process of the invention.

The solid electrolytes formed according to the invention may be applied in various electrochemical systems, particularly in energy storage systems, in particular in rechargeable batteries, particularly lithium batteries.

Thus, the invention also relates to the use of a solid electrolyte according to the invention and/or a composite electrode according to the invention in an electrochemical system, in particular in a lithium battery.

It also relates to an electrochemical system, in particular an energy storage device, particularly a rechargeable battery, in particular a lithium battery, particularly a lithium ion or lithium metal battery, comprising at least one solid electrolyte as obtained according to the invention, in particular comprising at least one solid electrolyte film according to the invention and/or at least one composite electrode comprising a solid electrolyte according to the invention.

Other characteristics, variants and advantages of the process for preparing a solid electrolyte according to the invention will be more readily apparent on reading the following description, examples and figures, which are given by way of illustration and do not limit the invention.

BRIEF DESCRIPTION OF THE FIGURES

FIG. 1 shows, in schematic fashion, the procedure for preparing solid polymer electrolytes (SPEs) based on a PTMC polymer using the acid HTFSI as a catalyst without adding lithium salt, as used in example 1.1;

FIG. 2 shows, in schematic fashion, the procedure for preparing solid polymer electrolytes (SPEs) based on a PTMC-PCL copolymer using the acid HTFSI as a catalyst without adding lithium salt, as used in example 1.2;

FIG. 3 shows, in schematic fashion, the procedure for preparing hybrid solid electrolytes (HSEs) based on a PTMC polymer using the acid HTFSI as a catalyst without adding lithium salt, as used in example 1.3;

FIG. 4 shows, in schematic fashion, the procedure for preparing hybrid solid electrolytes (HSEs) based on a PTMC-PCL copolymer using the acid HTFSI as a catalyst without adding lithium salt, as used in example 1.4;

FIG. 5 shows, in schematic fashion, the procedure for preparing solid polymer electrolytes (SPEs) based on a PTMC polymer using the acid HTFSI as a catalyst, with addition of a lithium salt, as used in example 2.1.;

FIG. 6 shows, in schematic fashion, the procedure for preparing solid polymer electrolytes (SPEs) based on a PTMC-PCL copolymer using the acid HTFSI as a catalyst with addition of a lithium salt, as used in example 2.2;

FIG. 7 shows, in schematic fashion, the procedure for preparing hybrid solid electrolytes (HSEs) based on a PTMC polymer using the acid HTFSI as a catalyst with addition of a lithium salt, as used in example 2.3;

FIG. 8 shows, in schematic fashion, the procedure for preparing hybrid solid electrolytes (HSEs) based on a PTMC-PCL copolymer using the acid HTFSI as a catalyst with addition of a lithium salt, as used in example 2.4;

FIG. 9 shows, in schematic fashion, the procedure for synthesis of PTMC using the catalyst $Sn(Oct)_2$ as described in example 3.1;

FIG. 10 shows, in schematic fashion, the synthesis of PTMC by ROP using the catalyst HTFSI followed by the direct formulation of a composite electrode without adding lithium salt, as described in example 4.1;

FIG. 11 shows, in schematic fashion, the synthesis of PTMC by ROP using the catalyst HTFSI followed by the direct formulation of a composite electrode with addition of the lithium salt, as described in example 4.2;

FIG. 12 shows, in schematic fashion, the procedure for preparing batteries according to example 4.3;

FIG. 13 shows the $^1H$ NMR spectra of the PTMC polymers having a molecular mass Mn of approximately 10,000 $g \cdot mol^{-1}$ synthesized by ROP using (a) the catalyst HTFSI with a catalyst/initiator molecular ratio=6.44 (referred to as SI10PPA1), as described in example 1.1, (b) the catalyst HTFSI with a catalyst/initiator molecular ratio=1.00 (referred to as SI10PPA2), as described in example 2.1, and (c) the catalyst $Sn(Oct)_2$ (referred to as Sn10PPA), as described in example 3.1;

FIG. 14 shows the course of the ion conductivity of solid electrolytes prepared based on PTMC having a molecular mass Mn of approximately 10,000 $g \cdot mol^{-1}$ synthesized by ROP using the catalyst HTFSI without adding lithium salt (referred to as SI10PPA1-TFSI15), as described in example 1.1, or with addition of the lithium salt (referred to as SI10PPA2-TFSI15), as described in example 2.1, compared to that of the electrolyte based on PTMC synthesized using the catalyst $Sn(Oct)_2$ (referred to as Sn10PPA-TFSI15), prepared as described in example 3;

FIG. 15 shows the cyclic voltammetry curves of solid electrolytes prepared based on PTMC having a molecular mass Mn of approximately 10,000 $g \cdot mol^{-1}$ synthesized by ROP using the catalyst HTFSI without adding lithium salt (referred to as SI10PPA1-TFSI15), as described in example 1.1, or with addition of lithium salt (referred to as SI10PPA2-TFSI15), as described in example 2.1, compared to that of the electrolyte based on PTMC synthesized using the catalyst $Sn(Oct)_2$ (referred to as Sn10PPA-TFSI15), prepared as described in example 3;

FIG. 16 shows six initial cathodic cyclic voltammetry curves of the solid electrolytes SI10PPA1-TFSI15 (a) and SI10PPA2-TFSI15 (b), compared to those of the electrolyte Sn10PPA-TFSI15 (c), and their coulombic cycling efficiency (d);

FIG. 17 shows the galvanostatic cycling curves of a complete battery, prepared as described in example 4.3, containing the lithium metal anode (thickness 135 μm), the electrolyte SI10PPA1-TFSI15, prepared without adding lithium salt, as described in example 1.1, and the composite cathode based on SI10PPA2 (referred to as NMC2), prepared with the addition of lithium salt as described in example 4.2;

FIG. 18 shows the galvanostatic cycling curves of a complete battery, prepared as described in example 4.3, containing the lithium metal anode (thickness 135 μm), the electrolyte SI10PPA2-TFSI15, prepared with the addition of lithium salt, as described in example 2.1, and the composite cathode based on SI10PPA2 (referred to as NMC2), prepared with the addition of lithium salt as described in example 4.2.

In the following text, the expressions "between . . . and . . . ," "ranging from . . . to . . . " and "varying from . . . to . . . " are equivalent and are intended to mean that the limits are included, unless otherwise specified.

DETAILED DESCRIPTION

Preparation of the Solid Electrolyte

Step (i): Synthesis of (Co)Polymer of Polycarbonate Type

As indicated above, the preparation of a solid electrolyte according to the invention proceeds, in a first step, by synthesis of a (co)polymer by ring-opening (co)polymerization (also referred to as "ROP" for "ring-opening polymerization" in English) of at least one five- to eight-membered cyclic carbonate and, optionally, of at least one five- to eight-membered lactone.

The term "copolymer" refers to un polymer derived from at least two different types of monomers. In the text below, unless otherwise specified, the term "polymer" or "polycarbonate" will be used to designate, in the broad sense, both homopolymers and copolymers.

The cyclic carbonate monomers may more particularly be of formula (I) below:

[Chem 1]

where m is an integer between 1 and 4, particularly between 1 and 3, in particular m equals 1 or 2 and more particularly m equals 2;

said monomers being optionally substituted, on one or more of the carbon atoms of the ring, by one or more substituents, in particular selected from alkyl groups, in particular $C_1$ to $C_5$ linear or branched groups.

Thus, the cyclic carbonate monomers may be of formula (I') below:

[Chem 2]

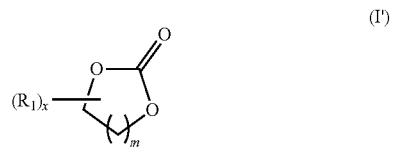

where m is as defined above; x is an integer between 0 and 2m+2; and $R_1$, carried by one or more carbon atoms of the ring, represent(s), independently of one another, substituents, in particular alkyl groups, in particular $C_1$ to $C_5$ linear or branched groups.

According to a particular embodiment, the cyclic carbonate monomer is selected among trimethylene carbonate and its derivatives. In particular, the cyclic carbonate monomer is trimethylene carbonate.

According to a first variant embodiment, the polycarbonate synthesized according to the invention is a (co)polymer obtained by ROP of one or more cyclic carbonate monomers.

In particular, it may be a poly(trimethylene carbonate), abbreviated PTMC, obtained by ROP of trimethylene carbonate (TMC).

According to another variant embodiment, the polymer synthesized according to the invention is a copolymer obtained by ROP of at least one cyclic carbonate monomer, in particular as defined above, and of at least one monomer of the lactone type.

Preferably, the molar ratio between the cyclic carbonate monomer(s) and the lactone-type monomer(s) is between 90/10 and 10/90, particularly between 80/20 and 20/80, in particular between 70/30 and 30/70 and more particularly approximately 60/40.

The term lactone refers more particularly to monomers meeting formula (II) below:

[Chem 3]

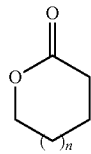

(II)

where n equals 0 or is an integer from 1 to 3;
said monomers being optionally substituted, on one or more of the carbon atoms of the ring, by one or more substituents, in particular selected from alkyl groups, in particular $C_1$ to $C_5$ linear or branched groups.

Thus, the monomers of the lactone type may be of formula (II') below:

[Chem 4]

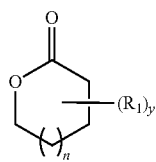

(II')

where n is as defined above; y is an integer between 0 and 2n+6; and $R_1$, carried by one or more carbon atoms of the ring, represent(s), independently of one another, substituents, in particular alkyl groups, in particular $C_1$ to $C_5$ linear or branched groups.

According to a particular embodiment, the copolymer synthesized according to the invention is formed from ε-caprolactone (referred to as CL).

The copolymers may more particularly be of the random or gradient type.

By way of example, the copolymer synthesized in step (i) of the process of the invention may be formed from trimethylene carbonate (TMC) and ε-caprolactone (CL). In other words, it may be a poly(trimethylene carbonate)-poly(ε-caprolactone) copolymer (PTMC-PCL), in particular having a molar ratio between monomer units derived from TMC and monomer units derived from CL of between 90/10 and 10/90, particularly between 80/20 and 20/80, in particular between 70/30 and 30/70 and more particularly approximately 60/40.

According to a particular embodiment, the (co)polymers synthesized according to the invention are selected from PTMC, PTMC-PCL copolymers, in particular as described above, and mixtures thereof.

Synthesis of (Co)Polymers

As indicated above, polycarbonate synthesis is carried out in step (i) by ring-opening (co)polymerization of the monomers as described above, in the presence of at least one Brønsted superacid as a catalyst and, advantageously, initiated by at least one compound comprising one or more hydroxide group(s).

ROP Initiator

According to a particular embodiment, the (co)polymerization according to the invention is conducted in the presence of a compound, in particular of an organic molecule, comprising one or more hydroxyl groups, referred to as an "initiator" (or "starter").

The use of an ROP initiator, in particular added in a specified amount to the initial reaction mixture, advantageously makes it possible to control the molecular mass of the polycarbonates synthesized according to the invention.

The ROP initiator compound may be of various types, provided that it has at least one hydroxyl group allowing the polymerization reaction to be initiated. It may be selected in particular among water and/or alcohols, in particular alcohols having one to four hydroxyl groups and more particularly one or two hydroxyl groups.

According to a particular embodiment, the ROP initiator may be water. It may for example be residual water added with at least one of the monomers of the cyclic carbonate and/or lactone type used.

According to a particularly advantageous embodiment, the initiator is added in a specified amount to the initial reaction mature.

Said ROP initiator or starter may have a number average molecular mass ranging from 90 to 1,000 g·mol$^{-1}$, in particular 90 to 500 g·mol$^{-1}$.

It may more particularly be selected from alcohols having one or more hydroxyl groups, in particular one to four hydroxyl groups, particularly one or two hydroxyl groups.

According to a particular embodiment, the initiator is a monoalcohol. It may more particularly be an ROH compound in which the R group represents a "non-reactive" group.

The term "non-reactive" group is intended to refer to a non-reactive group under the conditions of preparation and use of the polycarbonate according to the invention. More particularly, the R group does not have a reactive group with respect to monomers of the cyclic carbonate and lactone type used, nor a reactive group with respect to alkali or alkaline earth metals, particularly with respect to lithium metal, alkali metal or alkaline earth metal salts, particularly with respect to lithium salts.

The R group may more particularly be:
  an alkyl group, linear or branched, which may be substituted by mono- or polycyclic or mono- or polyheterocyclic groups, condensed or not, saturated or unsaturated, aromatic or not; or a mono- or polycyclic or mono- or polyheterocyclic group, condensed or not, saturated or unsaturated, aromatic or not;
the alkyl group and/or said mono- or poly(hetero)cyclic group(s), which may optionally be substituted by one or more fluorine atoms.

Within the framework of the invention, the following terms are as defined below:
- "alkyl," a saturated, linear or branched aliphatic group; for example, a $C_{1-4}$ alkyl group represents a carbon chain of 1 to 4 carbon atoms, linear or branched, more particularly a methyl, ethyl, propyl, isopropyl, butyl, isobutyl, tert-butyl;
- "polycyclic group," a group having two or more nodes (rings), condensed (ortho-condensed or ortho- and peri-condensed) among themselves, i.e. having, two by two, at least two carbons in common.
- "heterocycle," a cyclic group, preferably with 4, 5 or 6 members, comprising one or more heteroatoms, in particular selected from oxygen, sulfur and nitrogen. The mono- or poly(hetero)cyclic groups according to the invention may be unsaturated, partially saturated or saturated. An aromatic ring may in particular be benzene.

In particular, a polycyclic group according to the invention is composed of two to six rings, the rings comprising, independently of one another, from 4 to 6 members. The polycyclic group may include one or more heteroatoms. In this case, one speaks of a "polyheterocyclic group."

The initiator used for the polycarbonate synthesis by ROP according to the invention may for example be selected from the molecules below.

[Chem 5]

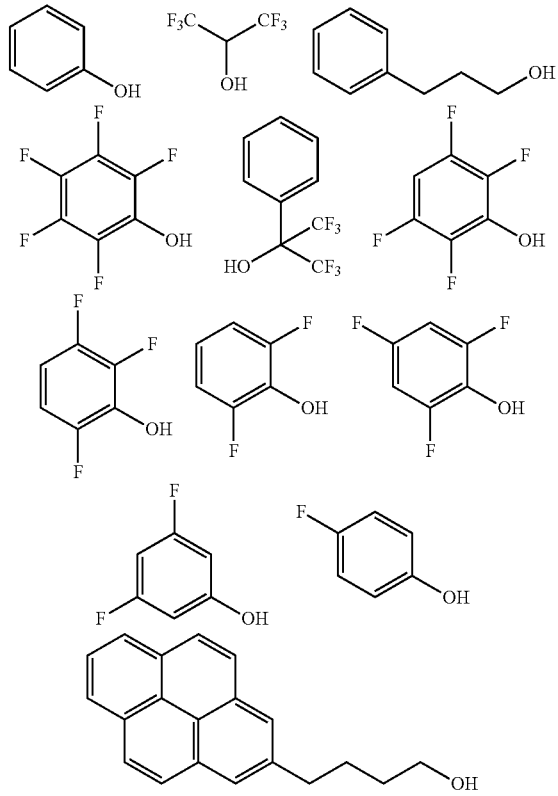

According to another particular embodiment, the initiator is a compound having at least two hydroxyl groups, in particular two to four hydroxyl groups, for example two hydroxyl groups.

In particular, it may be a compound of formula R'(—OH)$_x$, where x represents an integer from 2 to 4; and R' represents a divalent, trivalent or tetravalent non-reactive group, in particular an alkyl group, particularly a $C_1$ to $C_6$ group, in particular a $C_1$ to $C_3$ group, linear or branched, such as ethylene glycol (also abbreviated "EG") or glycerol.

The initiator may also be of the macroinitiator type. The term "macroinitiator," within the meaning of the invention, refers to a polymer comprising, at race least one of its terminals, a hydroxyl group capable of initiating the ROP reaction according to the invention. This makes it possible to form a block copolymer. Said macroinitiator may for example be a polydimethylsiloxane carrying a terminal hydroxyl group.

The nature of the initiator used for initiating the ROP reaction according to the invention is by no means limited by the above-mentioned compounds, and other initiators may be considered.

Advantageously, in the case of an initiator having a plurality of hydroxyl groups, the pKa values of the different hydroxyl groups are substantially identical. This thus makes it possible to access polycarbonates having a branched structure, or dendrimer, having symmetrical branches.

According to a particular embodiment, the initiator is selected among 3-phenyl-1-propanol (also abbreviated "PPA") and ethylene glycol. In particular, the initiator may be PPA. The initiator will be integrated at the end of the chain of the synthesized (co)polymer.

According to a particular embodiment, the monomer(s) and initiator(s) are used in a monomer(s)/initiator(s) molar ratio of between 40/1 and 1000/1, in particular between 50/1 and 500/1.

According to a particular embodiment, the initiator(s)/catalyst molar ratio is between 1/10 and 10/1.

Brønsted Superacid Catalyst

As indicated above, the ROP reaction conducted in step (i) of the process of the invention is catalyzed by at least one Brønsted superacid compound, capable of forming, after neutralization in step (ii) of the process of the invention, an ion-conducting alkali metal or alkaline earth metal salt.

The Brønsted superacids are known to the person skilled in the art; they are described for example in the publication [13]. The Brønsted superacids may in particular be characterized by a pKa value in 1,2-dichloroethane (DCE) of less than or equal to −1, in particular less than or equal to −10.

In particular, the Brønsted superacid catalyst used for the polycarbonate synthesis according to the invention is selected among the Brønsted superacids that produce, after neutralization in step (ii) of the process of the invention, alkali metal or alkaline earth metal salts, in particular lithium salts, commonly used as ion conducting salts in electrochemical devices, particularly lithium batteries.

The Brønsted superacid catalyst can thus more particularly be selected among:
- bis(trifluoromethanesulfonyl)imide acid (HTFSI), also called triflimide acid or bistriflimide acid and also abbreviated as "HNTf$_2$";
- trifluoromethanesulfonic acid (HTFSA), also called triflic acid, and also abbreviated as "TfOH";
- bis(fluorosulfonyl)imide acid (HFSI) [14];
- fluorosulfuric acid (FSO$_3$H);
- tetrafluoroboric acid (HBF$_4$);
- hexafluorophosphoric acid (HPF$_6$);

hexafluoroarsenic acid ($HAsF_6$);
perchloric acid ($HClO_4$);
bis(pentafluoroethanesulfonyl)imide acid, also called $HN(SO_2C_2F_5)_2$ and also abbreviated as "HBETI";
bis(heptafluoropropanesulfonyl)imide acid, also called $HN(SO_2C_3F_7)_2$;
bis(nonafluorobutanesulfonyl)imide acid, also called $HN(SO_2C_4F_9)_2$;
pentafluoroethanesulfonic acid ($C_2F_5SO_3H$);
4,5-dicyano-2-trifluoromethyl-imidazolide acid, also abbreviated as "HTDI";
bis(oxalato)boric acid ($HB(C_2O_4)_2$), also abbreviated as "HBOB";
difluoro(ethanedioato)boric acid ($HBF_2(C_2O_4)$), also called oxalatodigluoroboric acid and also abbreviated as "HFOB, HODFB, or $HF_2OB$";
tris[(trifluoromethyl)sulfonyl]methane acid, also called triflidic acid and also abbreviated as "$Tf_3CH$";
dicyanamide acid ($NH—(CN)_2$), abbreviated DCA;
tricyanomethamide acid ($CH—(CN)_3$), abbreviated TCM;
and mixtures thereof.

According to a particular embodiment, the Brønsted superacid catalyst may be selected among HTFSI, TfOH, HFSI, $FSO_3H$ and mixtures thereof, preferably among HTFSI, TfOH and mixtures thereof.

In the text below, and unless otherwise specified, the term "catalyst" refers to a unique Brønsted superacid catalyst, such as HTFSI or TfOH, or a mixture of at least two different catalysts, for example a mixture of HTFSI and TfOH.

According to a particular embodiment, the synthesis by ROP in step (i) is carried out in the presence of the catalyst HTFSI.

According to another particular embodiment, the synthesis by ROP in step (i) is carried out in the presence of the catalyst TfOH.

The monomer(s) and said Brønsted superacid type catalyst may more particularly be used in a monomer/catalyst molar ratio of between 4 and 10000, in particular between 5 and 5000.

According to a first variant embodiment, said Brønsted superacid type catalyst, for example HTFSI or TfOH, is used in step (i) in an excess amount in the starting reaction medium, in particular in an amount that makes it possible, after neutralization of said catalyst in step (ii) of the process of the invention by a metal hydride, as detailed below, to obtain the amount of metallic salt desired for the solid electrolyte, without requiring step (iii) of addition of an additional amount of metallic salt.

Thus, in the framework of this variant, all of the alkali metal or alkaline earth metal salt, for example of the type $M^+TFSI^-$ or $M^+Tf^-$, with $M^+$ representing an alkali metal or alkaline earth metal cation, in particular LiTFSI or LiTf, at the level of the solid electrolyte formed according to the invention, is derived from the Brønsted superacid catalyst initially used in the process of the invention for polycarbonate synthesis.

The process for preparing a solid electrolyte according to the invention, in comparison to the conventional processes described above, advantageously eliminates, in addition to the catalyst elimination steps, the step of addition of a metallic salt.

In particular, said Brønsted superacid catalyst may be used in an amount such that the monomer(s)/catalyst molar ratio is between 0.5 and 30, in particular between 5 and 15 and more particularly between 10 and 15, particularly approximately 15.

After neutralization of the catalyst in step (ii), in particular by lithium hydride, the molar ratio of the carbonyl groups of the polycarbonates relative to lithium, abbreviated [CO]/[$Li^+$], may thus advantageously be between 0.5 and 30, in particular between 5 and 15 and more particularly between 10 and 15, particularly approximately 15.

According to another variant embodiment, said Brønsted superacid type catalyst, for example HTFSI or HTFSA, is used in step (i) in a catalytic amount, in other words only in an amount sufficient to accelerate the ROP reaction.

In particular, the catalyst may be used in a monomer/catalyst molar ratio of between 40/1 and 1000/1, in particular between 50/1 and 500/1.

The initiator/catalyst molar ratio may in particular be between 1/1 and 10/1, in particular approximately 1/1.

Within the framework of this variant, the process of the invention preferably comprises a step (iii) of addition, to the mixture obtained after neutralization of the catalyst, of an additional amount of alkali metal or alkaline earth metal salt(s), in particular lithium salt(s), to achieve the desired amount of alkali metal or alkaline earth metal salt(s) in the solid electrolyte formed according to the invention.

Preferably, the amount of lithium salt added in step (iii) is adjusted to achieve, at the level of the mixture after addition of the lithium salt, a molar ratio of the carbonyl groups of the polycarbonate relative to lithium, abbreviated [CO]/[$Li^+$], of between 0.5 and 30, in particular between 5 and 15 and more particularly between 10 and 15, particularly approximately 15.

Within the framework of this variant, the amount of alkali metal or alkaline earth metal salt(s) at the level of the solid electrolyte formed according to the invention thus comprises the salt formed from neutralization of the Brønsted superacid catalyst initially used for polycarbonate synthesis, for example LiTFSI or LiTf, as well as the alkali metal or alkaline earth metal salt(s), particularly lithium salts, which is/are identical to or different from the salt derived from neutralization of the Brønsted superacid catalyst, added to the mixture obtained after neutralization of the catalyst.

The (co)polymerization reaction in step (i) is conducted in a solvent medium.

Preferably, it is conducted under agitation.

The solvent medium may more particularly be composed of one or more organic solvent(s), particularly non-polar and aprotic solvents, selected in particular from N-methyl-2-pyrrolidone (NMP), chloroform ($CHCl_3$), dichloromethane (DCM), tetrahydrofuran and mixtures thereof. In particular, it may be carried out in dichloromethane or NMP.

According to a particular embodiment, the concentration of monomers in the initial reaction medium is greater than or equal to 3 mol·$L^{-1}$ (M), in particular greater than or equal to 5 mol·$L^{-1}$. It may be between 3 and 15 mol·$L^{-1}$, in particular between 5 and 10 mol·$L^{-1}$.

Advantageously, the ROP reaction in step (i) of the process according to the invention is carried out at low temperature, in particular at a temperature of less than or equal to 40° C., particularly between 20 and 40° C. and more particularly at ambient temperature. The term ambient temperature refers to a temperature of 25±5° C.

The duration of polymerization may be adjusted in order to obtain increased conversion of monomers. In particular, the duration of polymerization is advantageously short; it may be less than 3 days, in particular less than or equal to 72 hours, in particular less than or equal to 48 hours and more particularly between 24 and 48 hours.

The rate of monomer conversion after synthesis of the polycarbonate is advantageously greater than 90%, in particular greater than 95%. The rate or yield of conversion may be determined based on the mass of the (co)polymers obtained and the masses of monomer(s) and, optionally, of the starting initiator.

The ROP reaction may be carried out in continuous, semi-continuous or discontinuous mode. According to a particular embodiment, it is carried out discontinuously ("batch" in English), with all of the monomers being introduced at one time into the reactor, the (co)polymer being recovered at one time at the end of the reaction.

According to another embodiment, the ROP reaction may be carried out in semi-continuous or continuous mode, in particular in the case of the synthesis of copolymers of the random or gradient type. It may more particularly comprise a phase of progressive introduction of the monomer(s) into the reactor. The progressive introduction of the monomers may be carried out by addition during polymerization of successive fractions of monomer(s), or continuously.

As indicated above, the synthesis conducted by ROP under the conditions of the invention, advantageously in the presence of an initiator as described above, allows favorable control of the molecular mass and polydispersity of the polycarbonates obtained.

In particular, the polycarbonates synthesized according to the invention advantageously have a molar average molecular mass, referred to as Mn, of less than or equal to 200,000 g·mol$^{-1}$, in particular between 5,000 and 100,000 g·mol$^{-1}$, and more particularly between 5,000 and 50,000 g·mol$^{-1}$. The molar average molecular mass may be measured by gel permeation chromatography (or GPC). It can also be obtained by means of $^1$H NMR analysis of the (co)polymer obtained.

It may be advantageously controlled according to the synthesis method used according to the invention by the molar ratio of the monomer(s) to the initiator in the initial reaction mixture.

The (co)polymers synthesized according to the invention advantageously have a polydispersity of less than or equal to 2.5, in particular less than or equal to 2.0. The polydispersity (also referred to as polydispersity index, abbreviated PDI) is equal to the ratio of the weight average molecular mass Mw to the molar average molecular mass Mn. The weight average molecular mass may be determined by size exclusion chromatography, optionally coupled with static light diffusion, or by Wheatstone bridge differential viscosimetric measurement.

The polycarbonates synthesized according to the invention of the type PTMC may have a gas transition temperature, referred to as Tg, of between −10° C. and −50° C., in particular between −20° C. and −40° C. The copolymers of the type PTMC-PCL may have a Tg of between −20° C. and −70° C., in particular between −30° C. and −60° C. The gas transition temperature may be determined by differential scanning calorimetry (DSC for "differential scanning calorimetry" in English).

The polycarbonates obtained in the reaction medium in step (i) of the process according to the invention, after ROP in the presence of an initiator of the type mono-alcohol R—OH, may for example have formula (III) below:

[Chem 6]

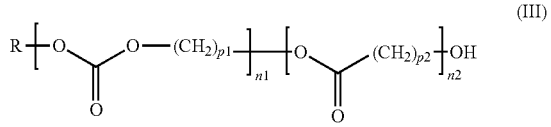

(III)

where:
R represents the group derived from the initiator of the type monoalcohol ROH, as defined above, for example a phenylpropyl group derived from the initiator PPA;
p1 is an integer ranging from 2 to 4, in particular p1 equals 3;
p2 is an integer ranging from 4 to 7, in particular p2 equals 5;
n1 is a positive integer corresponding to the average number of monomer units derived from the cyclic carbonate monomers, in particular n1 is between 30 and 500;
n2 equals 0 or is a positive integer corresponding to the average number of monomer units derived from the lactone monomers, in particular n2 is between 20 and 500;
the linking of the monomer units in formula (III) may be of the random or gradient type.

Preferably, as described above, the molar ratio of the monomer units derived from the cyclic carbonates to the monomer units derived from the lactones, n1/n2, is between 90/10 and 10/90, in particular between 80/20 and 20/80, particularly between 70/30 and 30/70 and more particularly equals approximately 60/40.

By way of example, the polycarbonates synthesized according to the invention may show the structure of formula (III') below:

[Chem 7]

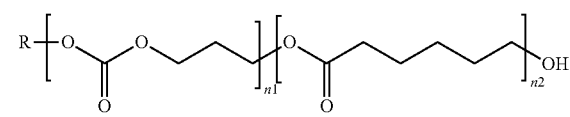

(III')

where R, n1 and n2 are as defined above.

Of course, more complex polymer structures, for example of the dendrimer type, may be obtained by means of an initiator using a plurality of hydroxyl groups.

Step (ii): Neutralization of Catalyst

As indicated above, the process of the invention comprises, subsequent to the synthesis in step (i) of the polycarbonates as described above, a step (ii) of neutralization of the catalyst of the Brønsted superacid type, for example HTFSI or TfOH, by at least one alkali metal or alkaline earth metal hydride.

Step (ii) comprises more particularly the addition, directly to the reaction medium obtained after synthesis by ROP of the polycarbonates, of at least one alkali metal or alkaline earth metal hydride, abbreviated "M$^+$H$^-$" with M$^+$ representing an alkali metal or alkaline earth metal cation.

Within the framework of the invention, the following terms are as defined below:
"alkali metals," the chemical elements of the first column of the periodic table of the elements, and more particularly selected among lithium, sodium, potassium, rubidium, and cesium. Preferably, the alkali metal is lithium, sodium or potassium, and more preferably lithium;
"alkaline earth metals," the chemical elements of the second column of the periodic table of the elements, and more particularly selected among beryllium, magnesium, calcium, strontium, barium, and radium. Preferably, the alkaline earth metal is magnesium or calcium.

The alkali metal or alkaline earth metal hydride added in step (ii) is preferably lithium hydride (LiH).

The amount of metal hydride $M^+H^-$, in particular lithium hydride, is such that it makes it possible to neutralize all of the catalyst(s) of the Brønsted superacid type, in particular HTFSI and/or TfOH, present at the level of the reaction medium after polycarbonate synthesis, and to protect the terminal hydroxy group(s) of said synthesized polycarbonate(s). Thus, it is up to the person skilled in the art to adjust the amount of metal hydride $M^+H^-$ to be introduced in step (ii) of the process of the invention, with respect to the amount of catalyst used for the polycarbonate synthesis in step (i), as well as the estimated amount of hydroxyl groups at the chain terminals of the polycarbonates synthesized.

The metal hydride, in particular lithium hydride, is used in step (ii) in an excess amount with respect to the catalyst present in the reaction medium. In other words, the metal hydride ($M^+H^-$), in particular lithium hydride (LiH), is added to the reaction medium obtained in step (i) in a molar amount strictly greater than that of the catalyst(s) used in step (i).

The neutralization of the catalyst of the Brønsted superacid type, for example HTFSI and/or TfOH, by an alkali metal or alkaline earth metal hydride $M^+H^-$, in particular by lithium hydride, leads to the formation of a salt of said alkali metal or alkaline earth metal, for example $M^+TFSI^-$ and/or $M^+Tf^-$.

After step (ii), all of the catalyst present in the reaction medium is thus converted to an alkali metal or alkaline earth metal organic salt, in particular lithium salt, for example lithium bis(trifluoromethanesulfonyl)imide (LiTFSI) and/or lithium trifluoromethanesulfonate (LiTf).

In particular, in the case of the use of the HTFSI as a catalyst, this substance is neutralized with the metal hydride $M^+H^-$, in particular lithium hydride, in order to form a salt $M^+TFSI^-$, in particular LiTFSI.

In the particular case of the use of TfOH as a catalyst, this substance is neutralized with the metal hydride $M^+H^-$, in particular lithium hydride, in order to form a salt $M^+Tf^-$, in particular LiTf.

Preferably, the reaction medium is agitated, simultaneously with or following addition of the metal hydride, so as to obtain total neutralization of the catalyst and a favorable dispersion of the alkali metal or alkaline earth metal salt(s) created at the level of the polycarbonates. In particular, the mixture is subjected to vigorous agitation, for example using a magnetic agitator.

As indicated above, the metal hydride, in particular lithium hydride, is introduced in step (ii) of the process of the invention in an excess amount such that it allows neutralization of all of the catalyst, by also protection (or capping) of the hydroxyl group(s) at the chain terminals of the polycarbonates synthesized according to the invention.

In fact, a polycarbonate synthesized in step (i) of the process according to the invention may comprise a single terminal hydroxyl group or two, or even more than two, terminal hydroxyl groups, depending in particular on the nature of the ROP initiator reaction (for example, monoalcohol or diol).

The formation of protected hydroxyl terminals, also referred to as "capped" (more referred to by the term "end-capped" in English) advantageously makes it possible to increase the electrochemical stability of the solid electrolyte based on said polycarbonate(s), the terminal hydroxyl groups being sensitive to reduction and oxidation, and tending to degrade on contact with the lithium metal or lithium salts.

A hydroxyl group is "protected" by forming a more chemically and electrochemically stable group.

The hydroxyl group(s) at the chain terminals of the polycarbonates synthesized according to the invention are thus advantageously protected, by reaction with the metal hydride ($M^+H^-$) introduced in an excess amount into the reaction medium, in the form of metal alcoholate groups $—O^-M^+$, with $M^+$ representing an alkali metal or alkaline earth metal cation, in particular in the form of lithium alkoxide (—OLi).

The addition in step (ii) of the metal hydride thus simultaneously makes it possible to neutralize all of the catalyst used for polycarbonate synthesis, in the form of an alkali metal or alkaline earth metal salt, in particular lithium salt, and to protect the terminal hydroxy groups of the polycarbonates synthesized in the form of alkali metal or alkaline earth metal alcoholate groups, in particular lithium alcoholates.

Advantageously, all of the catalyst used for the polycarbonate synthesis according to the invention is thus eliminated in step (ii) of the process of the invention via its conversion to an alkali metal or alkaline earth metal salt, in particular lithium salt.

The mixture obtained in step (ii) thus comprises, in the solvent medium of polycarbonate synthesis, for example in dichloromethane or NMP, the polycarbonate(s), the terminal hydroxyl groups of which are protected in the form of an alkali metal or alkaline earth metal alcoholate ($—O^-M^+$), in particular lithium alkoxide ($—O^-Li^+$), and the alkali metal or alkaline earth metal salt, in particular lithium salt, particularly LiTFSI or LiTf, resulting from the neutralization of the catalyst by the metal hydride.

The mixture obtained in step (ii), optionally supplemented by an additional amount of an alkali metal or alkaline earth metal salt and/or, optionally, by one or more conventional compounds, can thus be used in order to form a solid electrolyte or a composite electrode, directly after evaporation of the solvent medium, without requiring an intermediate purification step (for example, precipitation, filtering, washing, etc.) of the polycarbonates synthesized, elimination of the catalyst, preparation of the electrolyte, etc.

Step (iii): Optional Addition of Metallic Salt

As indicated above, the process of the invention may optionally comprise, after step (ii) of neutralization of the catalyst, a step (iii) of addition of at least one alkali metal or alkaline earth metal salt.

The salt added comprises more particularly the same metal cation as that of the metal hydride used in step (ii) of the process of the invention.

It may for example be a lithium, sodium or magnesium salt. In particular, the alkali metal or alkaline earth metal salt used in step (iii) of the process of the invention is a lithium salt. By way of examples of lithium salt, one can cite $LiPF_6$, $LiClO_4$, $LiBF_4$, $LiAsF_6$, $LiCF_3SO_3$, lithium bis(trifluoromethylsulfonyl)imide $LiN[SO_2CF_3]_2$ (LiTFSI), lithium bis(fluorosulfonyl)imide (known by the abbreviation LiFSI) $LiN[SO_2F]_2$, lithium trifluoromethanesulfonate (LiTf), lithium 4,5-dicyano-2-(trifluoromethyl)imidazole (known by the abbreviation LiTDI), lithium bispentafluoroethylsulfonylimide ($LiN(C_2F_5SO_2)_2$, known by the abbreviation LiBETI), lithium bis(oxalato)borate (known by the abbreviation LiBOB), lithium difluoro(oxalato)borate (known by the abbreviation LiFOB), lithium difluorophosphate ($LiPO_2F_2$) and mixtures thereof.

Preferably, the lithium salt is LiTFSI, LiTDI or LiFSI, preferably LiTFSI or LiFSI and more preferably LiTFSI.

The alkali metal or alkaline earth metal salt added to the mixture in step (iii), may be of the same type as or a different type from the alkali metal or alkaline earth metal salt formed by neutralization of the catalyst in step (ii).

According to a particular embodiment, it is of the same type as the alkali metal or alkaline earth metal salt formed by neutralization of the catalyst in step (ii). By way of example, in the case of the use of the HTFSI as a Brønsted superacid catalyst, converted in step (ii) to lithium salt LiTFSI by neutralization with lithium hydride (LiH), the metallic salt added in step (iii) of the process of the invention may more particularly be the lithium salt LiTFSI.

Step (iii) thus makes it possible to increase the amount of alkali metal or alkaline earth metal salt(s) obtained after neutralization of the catalyst in step (ii).

Step (iii) of addition of an alkali metal or alkaline earth metal salt is used in particular when the Brønsted superacid catalyst, for example HTFSI and/or TfOH, is introduced in step (i) in a catalytic amount as described above.

As indicated above, the amount of lithium salt(s) added in step (iii) is preferably adjusted to achieve a molar ratio of the carbonyl groups of the polycarbonate relative to lithium, abbreviated [CO]/[Li$^+$], of between 0.5 and 30, in particular between 5 and 15 and more particularly between 10 and 15, particularly approximately 15.

Preferably, the mixture is agitated, simultaneously with or subsequent to addition of said metallic salt(s), and prior to the use of said medium in step (iv), in order to obtain a favorable dispersion of the alkali metal or alkaline earth metal salt(s) at the level of the polycarbonates.

Step (iv): Formation of Solid Electrolyte or Composite Electrode

As mentioned above, the mixture obtained in step (ii) or (iii), comprising, in the solvent medium of polycarbonate synthesis, for example in dichloromethane or NMP, the polycarbonate(s), the terminal hydroxyl groups of which are protected in the form of an alkali metal or alkaline earth metal alcoholate (—O$^-$M$^+$), in particular of lithium alkoxide (—O$^-$Li$^+$), and the alkali metal salt(s), resulting at least partially from the neutralization of the catalyst(s) of the Brønsted superacid type used for the polycarbonate synthesis, is directly used in order to form a solid electrolyte.

The process of the invention may be used in order to form a solid electrolyte, in particular in the form of a solid electrolyte film or membrane, in particular of the solid polymer electrolyte (SPE) or hybrid solid electrolyte (HSE) type, or in order to form a solid electrolyte in a composite electrode.

The mixture obtained in step (ii) or (iii) may thus be supplemented by one or more auxiliary compounds selected with respect to the nature and the purpose of the solid electrolyte desired. In particular, the auxiliary compound(s) may be selected from the additives commonly used for the formulation of solid electrolytes or among the auxiliary compounds included in the composition of a composite electrode.

For example, in the context of preparation of a hybrid solid electrolyte (HSE), the mixture may be supplemented by at least one inorganic filler conductive of (an) alkali or alkaline earth metal cation(s). In the context of preparation of a composite electrode incorporating the solid electrolyte, the mixture may be supplemented by at least one active electrode material and, optionally, one or more conductive additives and/or one or more binders. The person skilled in the art is capable of selecting the nature of the auxiliary compound(s) with respect to the formulation of the solid electrolyte desired.

Solid Electrolyte

According to a first variant embodiment, the process of the invention is used in order to form a solid electrolyte, particularly in the form of a film or membrane of a solid electrolyte, in particular intended for application as an electrolyte separator in an electrochemical system, in particular a rechargeable battery, for example a lithium battery.

The solid electrolytes prepared according to the invention may be of the solid polymer electrolyte (SPE) or hybrid solid electrolyte (HSE) type.

In the context of formulation of a solid electrolyte of the HSE type, the process of the invention may further comprise, prior to the evaporation of the solvent medium, the addition to the mixture obtained in step (ii) or (iii) of at least one inorganic filler conductive of (an) alkali or alkaline earth metal cation(s), in particular an inorganic filler conductive of lithium ions.

The conductive fillers of lithium ions may for example be selected among lithium oxides such as $Li_7La_3Zr_2O_{12}$ (LLZO) and $Li_{0.33}La_{0.56}TiO_3$ (LLTO), $Li_{1.3}Al_{0.3}Ti_{1.7}(PO_4)_3$ (LATP), etc.

The fillers may also be selected among:
- garnets, for example $Li_7La_3Zr_2O_{12}$, the $Li_6La_2BaTa_2O_{12}$, etc.;
- lithium phosphates, for example $Li_3PO_4$, the $LiPO_3$, etc.;
- lithium borates, for example $Li_3BO_3$, etc.;
- oxynitrides, for example $Li_3PO_{4-x}N_{2x/3}$, $Li_4SiO_{4-x}N_{2x/3}$, $Li_4GeO_{4-x}N_{2x/3}$ with $0<x<4$ or $Li_3BO_{3-x}N_{2x/3}$ with $0<x<3$;
- lithium compounds based on lithium oxynitride and phosphorus (abbreviated LiPON);
- silicates, for example $Li_2Si_2O_5$.

According to a particular embodiment, the filler conductive of lithium ions is LATP.

The ion-conducting inorganic filler(s) may in particular be used in a conductive filler(s)/polycarbonate(s) volume ratio of between 20/80 and 80/20, in particular between 20/80 and 60/40.

In the context of use of the process in order to form a solid electrolyte film, step (iv) may more particularly comprise deposition of said mixture obtained in step (ii) or (iii), optionally supplemented by at least one inorganic filler conductive of (an) alkali or alkaline earth metal cation(s), on the surface of a substrate, for example by coating, followed by evaporation of the solvent medium, in order to obtain said solid electrolyte film, in particular a solid electrolyte dry film.

Preferably, the mixture is degassed prior to son deposition on the surface of the substrate so as to eliminate the air and the traces of hydrogen resulting from neutralization of the catalyst by the metal hydride in step (ii).

The evaporation may be carried out in a vacuum.

The evaporation may for example be carried out by drying, for example in an oven, at a temperature of between 30° C. and 40° C., in particular approximately 35° C., particularly for a period of between 8 hours and 24 hours, followed by drying in a vacuum at a temperature of between 60° C. and 120° C., in particular approximately 80° C., particularly for a period of between 24 hours and 72 hours in order to completely eliminate the solvent(s).

The term "dry" film is intended to mean that the solid electrolyte film comprises less than 0.1% by mass of solvent, in particular less than 0.05% by mass and more particularly less than 0.02% by mass of solvent.

The substrate at the surface of which is formed the solid electrolyte film is advantageously an inert substrate, in other words, it does not interact with the mixture used according to the invention.

The substrate may be of various types. It may be made of glass, aluminum, silicone, polyimide, polytetrafluoroethylene (PTFE), polyethylene terephthalate (PET), silicone or polypropylene.

The solid electrolyte film may optionally be detached from the substrate to be used at the level of the electrochemical system for which it is intended, in particular transferred onto at least one electrode, for example onto a composite electrode comprising a solid electrolyte of the same type, based on polycarbonates, and particularly onto a composite electrode comprising a solid electrolyte prepared according to the invention.

According to a variant embodiment, the solid electrolyte film may be formed directly on the surface of one of the electrodes of the electrochemical system, for example on the surface of a composite electrode comprising a solid electrolyte based on polycarbonates, in particular on the surface of a composite electrode according to the invention, or a lithium metal electrode.

The solid electrolyte film may have for example a thickness of between 20 and 500 μm, in particular between 20 and 100 μm and more particularly between 40 and 60 μm.

Composite Electrode Incorporating a Solid Electrolyte

According to another variant embodiment, the process of the invention is used in order to form a solid electrolyte in a composite electrode, in particular for use in an electrochemical system, in particular a rechargeable battery, for example a lithium battery.

Within the framework of this variant use, the process of the invention may comprise, according to a first embodiment:
- addition, to the mixture obtained in step (ii) or (iii), of at least one active electrode material and, optionally, one or more electron conductive additives and/or one or more additional binders; and
- deposition of said mixture on the surface of a current collector, followed by evaporation of the solvent medium in order to obtain said composite electrode.

In particular, this embodiment is used when the solvent medium of polycarbonate synthesis is particularly suitable for the formulation of a dispersion, referred to as "ink," of said active electrode material and, optionally, of the electron conductive additive(s) and/or additional binder(s). This is the case in particular when N-methyl-2-pyrrolidone (NMP) is used as a solvent of polycarbonate synthesis in step (i).

According to another particular embodiment, the preparation of a composite electrode comprising a solid electrolyte according to the invention may involve a solvent exchange step prior to addition of said active electrode material and, optionally, of the electron conductive additive(s) and/or additional binder(s). In particular, this embodiment may be used when the solvent medium of polycarbonate synthesis is not found to be optimal for the preparation of the ink intended for formation of the composite electrode.

The preparation of a composite electrode incorporating a solid electrolyte according to the invention may thus comprise:
- preparation of a dispersion, referred to as "ink," by adding to the solid electrolyte obtained in step (iv), after evaporation of the solvent medium, at least one active electrode material, optionally one or more electron conductive additives and/or one or more additional binders; optionally an additional amount of alkali metal or alkaline earth metal salt(s); and one or more solvents different from the solvent(s) used for the ROP in step (i); and
- deposition of said ink on the surface of a current collector, followed by evaporation of said solvent(s) in order to obtain said composite electrode.

The solvent(s) for the preparation of the ink may be selected from organic or aqueous solvents, in particular among N-methyl-2-pyrrolidone (NMP), acetonitrile (ACN), water and mixtures thereof.

The active materials for a composite positive electrode may for example be selected from lithium intercalation materials such as lithium phosphates, for example compounds of formula $Li_xFe_{1-y}M_yPO_4$, where M is selected from the group consisting of B, Mg, Al, Si, Ca, Ti, V, Cr, Mn, Co, Ni, Cu, Zn, Y, Zr, Nb and Mo; and $0.8 \leq x \leq 1.2$; $0 \leq y \leq 0.6$; compounds of formula $Li_xMn_{1-y-z}M'_yM''_zPO_4$ (LMP), where M' and M" are different from each other and are selected from the group consisting of B, Mg, Al, Si, Ca, Ti, V, Cr, Fe, Co, Ni, Cu, Zn, Y, Zr, Nb and Mo, with $0.8 \leq x \leq 1.2$; $0 \leq y \leq 0.6$ and $0 \leq z \leq 0.2$; such as $LiFePO_4$ (LFP), $LiMnPO_4$, $LiMn_yFe_{1-y}PO_4$ with $0.8 \leq x \leq 1.2$; $0 \leq y \leq 0.6$; lamellar compounds, such as lithium cobalt oxide $LiCoO_2$, lithium manganese oxide $LiMn_2O_4$, or materials based on lithium-nickel-cobalt-manganese $LiNi_xMn_yCo_zO_2$ with $x+y+z=1$ (also abbreviated as NMC), such as $LiNi_{0.33}Mn_{0.33}Co_{0.33}O_2$ or $LiNi_{0.6}Mn_{0.2}Co_{0.2}O_2$, or a material based on $LiNi_xCo_yAl_zO_2$ with $x+y+z=1$ (also abbreviated as NCA), or spinels (for example the spinel $LiNi_{0.5}Mn_{1.5}O_4$). Advantageously, the active materials for a positive electrode are selected from $LiNi_{0.6}Mn_{0.2}Co_{0.2}O_2$ (NCM cathodes) or $LiCoO_2$, preferably $LiNi_{0.6}Mn_{0.2}Co_{0.2}O_2$ (NMC622).

The active materials for a negative composite electrode may for example be carbon, graphite, lithium titanium oxide ($Li_4Ti_5O_{12}$) or titanium and niobium oxide ($TiNb_2O_7$). These may also be materials based on silicon or based on lithium or sodium, or based on tin and alloys thereof.

The electron conductive additives are used to improve the electronic conductivity of the electrode. They may be selected for example among carbon fibers, carbon black, carbon nanotubes and mixtures thereof.

One or more additional binders, different from said polycarbonate(s) used according to the invention, may be added to improve the cohesion of various components of the composite electrode, its mechanical strength on the current collector or its properties of flexibility. The additional binders may be selected from fluorinated binders, for example polytetrafluoroethylene (PTFE), polyvinylidene fluoride (PVDF), polysaccharides or latex, particularly of the type styrene-butadiene rubber (SBR, or in English, "styrene-butadiene rubber").

Preferably, the mixture is degassed prior to its deposition on the surface of the current collector, so as to eliminate the air and traces of hydrogen resulting from neutralization of the catalyst by the metal hydride in step (ii).

The current collector may in particular be made of aluminum, copper, nickel or iron. It allows the circulation des electrons, and therefore electronic conduction, outside the circuit. It may for example be an aluminum sheet optionally coated with carbon.

Deposition of the ink on the surface of the current collector may be carried out by a classical coating process, for example with a scraper, optionally with a controlled-thickness transfer system, or by a nozzle coating system in the form of a slit.

The evaporation of the solvent medium may be carried out by drying, for example in an oven, at a temperature of between 50° C. and 120° C., in particular approximately 60° C., particularly for a period of between 8 hours and 24 hours, followed by drying in a vacuum at a temperature of between 60° C. and 120° C., in particular approximately 80° C., particularly for a period of between 24 hours and 72 hours in order to completely eliminate the solvent(s). The layer of the composite electrode incorporating the solid electrolyte thus obtained, after elimination of the solvent(s), adheres to the current collector.

The composite electrode may more particularly comprise 5 to 30% by weight of (co)polycarbonate(s) according to the invention, in particular between 10 and 25% by weight and more particularly 12 to 20% by weight of (co)polycarbonate(s), with respect to the weight of the electrode.

The weight of the composite electrode is understood to be the weight of the different components of the electrode (solid electrolyte, active electrode material(s), optionally electronic conducting additive(s) and additional binder(s)), without the current conductor, and once the solvent(s) of the mixture has/have evaporated. One also speaks of dry weight. Thus, the rest of the composite electrode may more particularly be composed of one or more active material(s), preferably at least one electron conductive additive and optionally one or more additional binders.

The active material(s) may represent 60 to 95% by weight, in particular 70 to 90% by weight, of the total weight of the electrode.

The conductive additive(s), if present, may be used preferably in an amount ranging from 1 to 10% by weight, in particular 2 to 8% by weight, with respect to the weight of the composite electrode.

The additional binder(s), if present, may be used in an amount ranging from 2 to 7% by weight, in particular 3 to 5% by weight, with respect to the total weight of the composite electrode.

The composite electrode incorporating a solid electrolyte formed according to the invention may have a thickness of between 10 μm and 400 μm, in particular between 10 μm and 250 μm.

Electrochemical System

As indicated above, the solid electrolyte obtained according to the invention, particularly of the SPE or HSE type and/or the composite electrode incorporating a solid electrolyte obtained according to the invention, may advantageously be used in an electrochemical system.

The invention relates, according to another of its aspects, to an electrode/membrane electrode assembly, wherein said electrode is a composite electrode prepared according to the process of the invention and/or said membrane electrode is a solid electrolyte film, particularly of the solid polymer electrolyte or hybrid solid electrolyte type, prepared according to the process of the invention.

It also relates to an electrochemical system comprising at least one solid electrolyte film as obtained according to the invention, particularly of the SPE or HSE type, and/or at least one composite electrode comprising a solid electrolyte obtained according to the invention.

The electrochemical system may be a generator, converter, or electrochemical storage system, for example, a primary or secondary battery, for example a lithium, sodium, magnesium, potassium or calcium battery; a flow battery ("redox flow battery" in English); or a lithium-air, lithium-sulfur accumulator.

According to a particular embodiment, the solid electrolyte is used in a rechargeable battery, in particular in a lithium battery, particularly a lithium ion or lithium metal battery.

An electrochemical system according to the invention comprises, in a general manner, at least one positive electrode and one negative electrode between which is located an electrolyte, referred to as an electrolyte separator, acting as an ion conductor between the positive and negative electrodes.

In particular, the solid electrolyte prepared according to the invention may form the film of the electrolyte separator in the electrochemical system.

Advantageously, at least one of the electrodes of the electrochemical system is a composite electrode incorporating a solid electrolyte of the same type as the electrolyte separator.

The composite electrode incorporating a solid electrolyte based on polycarbonates may be obtained according to the process of the invention, as is the case for the composite electrodes prepared in example 4.

Alternatively, it may be obtained from polycarbonates synthesized via other conventional synthesis routes. In particular, it may be formed on the surface of a current collector by means of at least the following steps:

preparation of an ink comprising, in one or more solvents, at least one polycarbonate, for example synthesized by ROP using oxalatodigluoroboric methane sulfonic acid (MSA) as a catalyst or without a catalyst under microwave irradiation and the terminal hydroxyl groups of which are protected by reaction with a protective agent selected from acyl chlorides, acid anhydrides, and isocyanates, at least one alkali metal or alkaline earth metal salt, in particular a lithium salt, for example LiTFSI; at least one active electrode material, and optionally at least one electron conductive additive and/or at least one additional binder, as described above; and formation from said ink, on the surface of a current collector, of said composite electrode, in particular by deposition of the ink on the surface of the current collector, in particular by coating, particularly by coating with a scraper; followed by evaporation of the solvent(s) of the ink in order to form the electrode film.

The composite electrode, in particular obtained according to the process of the invention, may form the positive electrode and/or the negative electrode of the electrochemical system. It may form for example the positive electrode.

In the particular case of a lithium metal battery, the composite electrode is the positive electrode, the negative electrode being lithium metal.

In other cases of batteries, the positive electrode and the negative electrode may preferably both be composite electrodes according to the invention.

The electrode differing from a composite electrode, optionally used together with a composite electrode in an electrochemical system, may be of the conventional type.

As indicated above, an electrochemical system according to the invention may comprise a composite electrode incorporating a solid electrolyte prepared according to the invention. In this case, the electrolyte separator between said composite electrode formed according to the process of the invention and said second electrode of an electrochemical system according to the invention may be of different types. Preferred is a solid electrolyte film.

Preferably, the solid electrolyte separator is of the same type as the solid electrolyte incorporated at the level of the composite electrode according to the invention used for the electrochemical system.

In other words, the electrolyte separator may be a solid electrolyte film, in particular of the SPE or HSE type, based on one or more polycarbonates such as incorporated at the level of the solid electrolyte of said composite electrode.

The solid electrolyte film may be advantageously obtained according to a process of the invention as described above.

Alternatively, it may be obtained from polycarbonates synthesized by other conventional synthesis routes. In particular, it may be formed on the surface of a substrate by means of at least the following steps:
- mixing, with or without the presence of a solvent medium, of one or more polycarbonates with at least one alkali metal or alkaline earth metal salt, in particular a lithium salt and, optionally, at least one inorganic filler conductive of (an) alkali or alkaline earth metal cation(s), in particular an inorganic filler conductive of lithium ions; and
- formation, on the surface of a substrate, of a solid electrolyte film.

The solid electrolyte film may in particular be formed directly on the surface of one of the electrodes of the electrochemical system, for example on the surface of a composite electrode according to the invention or the lithium metal electrode. For example, it may be formed by coating the mixture as described above onto the surface of one of the electrodes, for example on the surface of the composite electrode, followed by evaporation of said solvent(s).

The invention will now be described by means of the following examples, which are of course given by way of example and do not limit the invention.

EXAMPLES

In the examples below, the following products are used.
For Synthesis of the (Co)Polymers:
Trimethylene carbonate (TMC, 99.5%, Actu-All Chemicals) is dried in a vacuum at 40° C. before being used. ε-caprolactone (CL, 97%); 3-phenylpropanol (PPA, 98%); ethylene glycol (EG, 99.8%); stannous octanoate $(Sn(Oct)_2$, 92.5-100%); bis(trifluoromethanesulfonyl)imide acid (HTFSI, >95%), trifluoromethanesulfonic acid (HTFSA, >99%); lithium hydride (LiH, 95%), marketed by Sigma Aldrich, are used as is. Dichloromethane (DCM, HPLC grade, Sigma Aldrich); and methanol (MeOH, HPLC grade), marketed by Sigma Aldrich, are used as is.
For Preparation of the Electrolytes:
Lithium bis(trifluoromethanesulonyl)imide (LiTFSI, 99.9%, Sigma Aldrich); and lithium trifluoromethanesulfonate (LiTFSA, 99.995%, Sigma Aldrich), are dried in a vacuum for 72 hours and stored in a glove box filled with argon. Anhydrous acetone (≥99.8%) and anhydrous acetonitrile (HPCL grade, ≥99.9%), marketed by Sigma Aldrich, are used as is. Ceramic conductor type NASICON $Li_{1.3}Al_{0.3}Ti_{1.7}P_3O_{12}$ (LATP), marketed by SCHOTT AG, is used as is unless otherwise specified.
For Preparation of the Electrodes:
Lithium-nickel-cobalt-manganese oxide $LiNi_{0.6}Mn_{0.2}Co_{0.2}O_2$ (NMC622), provided by Umicore, is dried at 120° C. in a vacuum for 12 hours and stored in a glove box filled with argon. Carbon black C65 (Super P), marketed by MTI Corporation, is used as is. PVdF (Solef® 5130), marketed by Solvay, is dried at 60° C. in a vacuum before use. N-methyl-2-pyrrolidone (NMP), marketed by Sigma Aldrich, is used as is.

Example 1

Formulation of Electrolytes Based on PTMC and Copolymer Without Adding Lithium Salt
1.1. Formulation of Solid Polymer Electrolytes (SPEs) Based on PTMC Using Oxalatodigluoroboric Acid HTFSI as a Catalyst Without Adding Lithium Salt The protocol below is followed for synthesis by ROP, using the catalyst HTFSI and initiated by a mono-alcohol (3-phenylpropanol, PPA), of PTMC, having a theoretical molecular mass of 10,000 g·mol$^{-1}$, and direct formulation of the electrolyte after synthesis.

The monomer TMC (10.000 g; 97.95 mmol, 96.62 equivalents) is introduced into a round-bottomed two neck 100 mL flask equipped with a magnetic agitator, a condenser and an argon inlet/outlet. DCM (20 mL) is then added to dissolve the TMC. The monomer concentration is approximately 5 M. Once the TMC is completely dissolved, the initiator PPA (136.7 µL, 1.01 mmol, 1 equiv.) is introduced into the reaction medium. Next, the catalyst HTFSI (1.836 g, 6.53 mmol, 6.44 equiv.) dissolved in 5 mL of DCM is introduced into the same reaction medium. The monomer/catalyst molar ratio, abbreviated [CO]/[HTFSI], is 15. The reaction mixture is mixed for 24-48 hours at ambient temperature.

After this, the LiH (0.0630 g, 7.92 mmol, 7.81 equiv.), 5% mol in excess with respect to the catalyst and the initiator, is added under vigorous agitation to neutralize the oxalatodigluoroboric acid HTFSI and the OH groups at the PTMC chain terminals. The molar ratio of the carbonyl groups of the polymer relative to lithium salt LiTFSI, abbreviated [CO]/[LiTFSI], is 15. After 12 hours, the mixture was degassed, coated onto substrates, and dried in an oven at 35° C. for 8 hours, followed by vacuum-drying at 80° C. for at least 72 hours in order to obtain the solid electrolyte, referred to as "SI10PPA1-TFSI15."

The same protocol above is used for the synthesis of solid polymer electrolytes based on PTMC polymers with a theoretical molecular mass of approximately 10,000 g·mol$^{-1}$ and molar ratios [CO]/[HTFSI] of 5; 10 and 30, abbreviated "SI10PPA1-TFSI5," "SI10PPA1-TFSI10" and "SI10PPA1-TFSI30," respectively.

The same protocol above is used for the synthesis of a solid polymer electrolyte based on PTMC polymer with a theoretical molecular mass of approximately 50,000 g·mol$^{-1}$ and a molar ratio [CO]/[HTFSI] of 15, abbreviated "SI50PPA1-TFSI15."

The procedure for preparing solid polymer electrolytes (SPEs) based on PTMC using oxalatodigluoroboric acid HTFSI as a catalyst without adding lithium salt is shown schematically in FIG. 1.

1.2. Formulation of Solid Polymer Electrolytes (SPEs) Based on PTMC-PCL Copolymer Using Oxalatodigluoroboric Acid HTFSI as a Catalyst Without Adding Lithium Salt The protocol below is followed for synthesis by ROP, using the catalyst HTFSI and initiated by a mono-alcohol (3-phenylpropanol, PPA), of PTMC-PCL copolymer having a theoretical molecular mass of 10,000 g·mol$^{-1}$ and direct formulation of the electrolyte after synthesis.

The monomers TMC (5.702 g; 55.85 mmol, 55.36 equivalents) and CL (4.250 g, 37.23 mmol, 36.91 equiv.) are introduced into a round-bottomed two neck 100 mL flask equipped with a magnetic agitator, a condenser and an argon inlet/outlet. Next, DCM (20 mL) is added to dissolve the TMC. The monomer concentration is approximately 5 M. Once the TMC is completely dissolved, the initiator PPA (136.0 µL, 1.01 mmol, 1 equiv.) is introduced into the reaction medium. Next, the catalyst HTFSI (1.745 g, 6.21 mmol, 6.15 equiv.) dissolved in 5 mL of DCM is introduced into the same reaction medium. The monomer/catalyst molar ratio, abbreviated [CO]/[HTFSI], is 15. The reaction mixture is mixed for 24-48 hours at ambient temperature.

After this, the LiH (0.0602 g, 7.57 mmol, 7.51 equiv.), 5% in excess with respect to the catalyst and the initiator, is added under vigorous agitation to neutralize the oxalatodigluoroboric acid HTFSI and the OH groups at the terminals of the copolymer chains. The molar ratio of the carbonyl groups of the polymer relative to lithium salt LiTFSI, abbreviated [CO]/[LiTFSI], is 15. After 12 hours, the mixture was degassed, coated onto substrates, and dried in an oven at 60° C. for 8 hours, followed by vacuum-drying at 80° C. for at least 72 hours in order to obtain the solid electrolytes, referred to as "I10PPA1-TFSI15."

The same protocol above is used for the synthesis of solid polymer electrolytes based on PTMC-PCL copolymers with a theoretical molecular mass of approximately 10,000 g·mol$^{-1}$ and molar ratios [CO]/[HTFSI] of 5; 10 and 30, abbreviated "I10PPA1-TFSI5," "I10PPA1-TFSI10" and "I10PPA1-TFSI30," respectively.

The same protocol above is used for the synthesis of a solid polymer electrolyte based on a PTMC-PCL copolymer with a theoretical molecular mass of approximately 50,000 g·mol$^{-1}$ and a molar ratio [CO]/[HTFSI] of 15, abbreviated "I50PPA1-TFSI15."

The procedure for preparing solid polymer electrolytes (SPEs) based on PTMC-PCL copolymer using oxalatodigluoroboric acid HTFSI as a catalyst without adding lithium salt is shown schematically in FIG. 2.

1.3. Formulation of Hybrid Solid Electrolytes (HSEs) Based on PTMC Using Oxalatodigluoroboric Acid HTFSI as a Catalyst Without Adding Lithium Salt The protocol below is followed for synthesis by ROP, using the catalyst HTFSI and initiated by a mono-alcohol (3-phenylpropanol, PPA), of PTMC, having a theoretical molecular mass of 10,000 g·mol$^{-1}$ and direct formulation of the electrolyte after synthesis.

The monomer TMC (10.000 g; 97.95 mmol, 96.62 equivalents) is introduced into a round-bottomed two neck 100 mL flask equipped with a magnetic agitator, a condenser and an argon inlet/outlet. DCM (20 mL) is then added to dissolve the TMC. The monomer concentration is approximately 5 M. Once the TMC is completely dissolved, the initiator PPA (136.7 µL, 1.01 mmol, 1 equiv.) is introduced into the reaction medium. Next, the catalyst HTFSI (1.836 g, 6.53 mmol, 6.44 equiv.) dissolved in 5 mL of DCM is introduced into the reaction medium. The monomer/catalyst molar ratio, abbreviated [CO]/[HTFSI], is 15. The reaction mixture is mixed for 24-48 hours at ambient temperature.

After this, the LiH (0.0630 g, 7.92 mmol, 7.81 equiv.), 5% in excess with respect to the catalyst and the initiator, is added under vigorous agitation to neutralize the oxalatodigluoroboric acid HTFSI and the OH groups at the PTMC chain terminals. The molar ratio of the carbonyl groups of the polymer relative to lithium salt LiTFSI, abbreviated [CO]/[LiTFSI], is 15. After 12 hours, the ceramic LATP (7.147 g, approximately 20% by volume with respect to the total volume of the electrolyte) is added and the mixture is mixed using a tubular mixer for 4 hours in order to obtain a homogeneous suspension. The suspension is degassed, coated onto the substrates, and oven-dried at 35° C. for 8 hours, followed by vacuum-drying at 80° C. for at least 72 hours in order to obtain the hybrid solid electrolyte, abbreviated "SI10PPA1-TFSI15-LATP20."

The same protocol above is used for the synthesis of hybrid solid electrolytes based on PTMC polymers with a theoretical molecular mass of approximately 10,000 g·mol$^{-1}$ and molar ratios [CO]/[HTFSI] of 5; 10 and 30, abbreviated "SI10PPA1-TFSI5-LATP20," "SI10PPA1-TF SI10-LATP20" and "SI10PPA1-TFSI30-LATP20," respectively.

The same protocol above is used for the synthesis of a hybrid solid electrolyte based on a PTMC polymer with a theoretical molecular mass of approximately 50,000 g·mol$^{-1}$ and a molar ratio [CO]/[HTFSI] of 15, abbreviated "SI50PPA1-TFSI15-LATP20."

The procedure for preparing hybrid solid electrolytes (HSEs) based on PTMC using oxalatodigluoroboric acid HTFSI as a catalyst without adding lithium salt is shown schematically in FIG. 3.

1.4. Formulation of Hybrid Solid Electrolytes (HSEs) Based on PTMC-PCL Copolymer Using Oxalatodigluoroboric Acid HTFSI as a Catalyst Without Adding Lithium Salt The protocol below is followed for synthesis by ROP, using the catalyst HTFSI and initiated by a mono-alcohol (3-phenylpropanol, PPA), of PTMC-PCL copolymer having a theoretical molecular mass of 10,000 g·mol$^{-1}$ and direct formulation of the electrolyte after synthesis.

The monomers TMC (5.702 g; 55.85 mmol, 55.36 equivalents) and CL (4.250 g, 37.23 mmol, 36.91 equiv.) are introduced into a round-bottomed two neck 100 mL flask equipped with a magnetic agitator, a condenser and an argon inlet/outlet. Next, DCM (20 mL) is added to dissolve the TMC. The monomer concentration is approximately 5 M. Once the TMC is completely dissolved, the initiator PPA (136.0 µL, 1.01 mmol, 1 equiv.) is introduced into the reaction medium. Next, the catalyst HTFSI (1.745 g, 6.21 mmol, 6.15 equiv.) dissolved in 5 mL of DCM is introduced into the same reaction medium. The monomer/catalyst molar ratio, abbreviated [CO]/[HTFSI], is 15. The reaction mixture is mixed for 24-48 hours at ambient temperature.

After this, the LiH (0.0602 g, 7.57 mmol, 7.51 equiv.), 5% in excess with respect to the catalyst and the initiator, is added under vigorous agitation to neutralize the oxalatodigluoroboric acid HTFSI and the OH groups at the terminals of the copolymer. The molar ratio of the carbonyl groups of the polymer relative to lithium salt LiTFSI, abbreviated [CO]/[LiTFSI], is 15. After 12 hours, the ceramic LATP (7.101 g, approximately 20% by volume with respect to the total volume of the electrolyte) is added and the mixture is mixed using a tubular mixer for 4 hours in order to obtain a homogeneous suspension. The suspension is degassed, coated onto the substrates, and oven-dried at 60° C. for 8 hours, followed by vacuum-drying at 80° C. for at least 72 hours in order to obtain the hybrid solid electrolyte, abbreviated "I10PPA1-TFSI15-LATP20."

The same protocol above is used for the synthesis of a hybrid solid electrolyte based on PTMC-PCL copolymers with a theoretical molecular mass of approximately 10,000 g·mol$^{-1}$ and molar ratios [CO]/[HTFSI] of 5; 10 and 30, abbreviated "I10PPA1-TFSI5-LATP20," "I10PPA1-TFSI10-LATP20" and "I10PPA1-TFSI30-LATP20," respectively.

The same protocol above is used for the synthesis of a hybrid solid electrolyte based on a PTMC polymer with a theoretical molecular mass of approximately 50,000 g·mol$^{-1}$ and a molar ratio [CO]/[HTFSI] of 15, abbreviated "I50PPA1-TFSI15-LATP20."

The procedure for preparing hybrid solid electrolytes (HSEs) based on PTMC-PCL copolymers using oxalatodigluoroboric acid HTFSI as a catalyst without adding lithium salt is shown schematically in FIG. 4.

Example 2

Formulation of Electrolytes Based on PTMC and PTMC-PCL Copolymer with Addition of a Lithium Salt 2.1. Formulation of Solid Polymer Electrolytes (SPEs) Based on PTMC Using Oxalatodigluoroboric Acid HTFSI as a Catalyst with Addition of a Lithium Salt The protocol below is followed for synthesis by ROP, using the catalyst HTFSI and initiated by a mono-alcohol (3-phenylpropanol, PPA), of PTMC, having a theoretical molecular mass of 10,000 g·mol$^{-1}$ and direct formulation of the electrolyte after synthesis.

The monomer TMC (10.000 g; 97.95 mmol, 96.62 equivalents) is introduced into a round-bottomed two neck 100 mL flask equipped with a magnetic agitator, a condenser and an argon inlet/outlet. DCM (20 mL) is then added to dissolve the TMC. The monomer concentration is approximately 5 M. Once the TMC is completely dissolved, the initiator PPA (136.7 µL, 1.01 mmol, 1 equiv.) is introduced into the reaction medium. Next, the catalyst HTFSI (0.285 g, 1.01 mmol, 1 equiv.) dissolved in 1 mL of DCM is introduced into the reaction medium. The initiator/catalyst molar ratio, abbreviated [PPA]/[HTFSI], is 1. The reaction mixture is mixed for 24-48 hours at ambient temperature.

After this, the LiH (0.0169 g, 2.13 mmol, 2.1 equiv.), 5% in excess with respect to the catalyst and the initiator, is added under vigorous agitation to neutralize the oxalatodigluoroboric acid HTFSI and the OH groups at the PTMC chain terminals. After 12 hours, the salt LiTFSI (1.584 g, 5.52 mmol) is added. The molar ratio of the carbonyl groups of the polymer relative to lithium salt LiTFSI, abbreviated [CO]/[LiTFSI], is 15. The mixture was degassed, coated onto substrates, and dried in an oven at 60° C. for 8 hours, followed by vacuum-drying at 80° C. for at least 72 hours in order to obtain the solid electrolyte, referred to as "SI10PPA2-TFSI15."

The same protocol above is used for the synthesis of solid polymer electrolytes based on PTMC polymers with a theoretical molecular mass of approximately 10,000 g·mol$^{-1}$ and molar ratios [CO]/[LiTFSI] of 5; 10 and 30, abbreviated "SI10PPA2-TFSI5," "SI10PPA2-TFSI10" and "SI10PPA2-TFSI30," respectively.

The same protocol above is used for the synthesis of a solid polymer electrolyte based on a PTMC polymer with a theoretical molecular mass of approximately 50,000 g·mol$^{-1}$ and a molar ratio [CO]/[LiTFSI] of 15, abbreviated "SI50PPA2-TFSI15."

The procedure for preparing solid polymer electrolytes (SPEs) based on PTMC using oxalatodigluoroboric acid HTFSI as a catalyst with addition of the lithium salt is shown schematically in FIG. 5.

2.2. Formulation of Solid Polymer Electrolytes (SPEs) Based on PTMC-PCL Copolymer Using Oxalatodigluoroboric Acid HTFSI as a Catalyst with Addition of the Lithium Salt The protocol below is followed for synthesis by ROP, using the catalyst HTFSI and initiated by a mono-alcohol (3-phenylpropanol, PPA), of PTMC-PCL copolymer having a theoretical molecular mass of 10,000 g·mol$^{-1}$ and direct formulation of the electrolyte after synthesis.

The monomers TMC (5.702 g; 55.85 mmol, 55.36 equivalents) and CL (4.250 g, 37.23 mmol, 36.91 equiv.) are introduced into a round-bottomed two neck 100 mL flask equipped with a magnetic agitator, a condenser and an argon inlet/outlet. Next, DCM (20 mL) is added to dissolve the TMC. The monomer concentration is approximately 5 M. Once the TMC is completely dissolved, the initiator PPA (136.0 µL, 1.01 mmol, 1 equiv.) is introduced into the reaction medium. Next, the catalyst HTFSI (0.284 g, 1.01 mmol, 1 equiv.) dissolved in 1 mL of DCM is introduced into the same reaction medium. The initiator/catalyst molar ratio, abbreviated [PPA]/[HTFSI], is 1. The reaction mixture is mixed for 24-48 hours at ambient temperature.

After this, the LiH (0.0168 g, 2.12 mmol, 2.1 equiv.), 5% in excess with respect to the catalyst and the initiator, is added under vigorous agitation to neutralize the oxalatodigluoroboric acid HTFSI and the OH groups at the terminals of the copolymer. After 12 hours, the salt LiTFSI (1.492 g, 5.20 mmol) is added. The molar ratio of the carbonyl groups of the polymer relative to lithium salt LiTFSI, abbreviated [CO]/[LiTFSI], is 15. The mixture was degassed, coated onto substrates, and dried in an oven at 60° C. for 8 hours, followed by vacuum-drying at 80° C. for at least 72 hours in order to obtain the solid electrolyte, referred to as "I10PPA2-TFSI15."

The same protocol above is used for the synthesis of solid polymer electrolytes based on PTMC-PCL copolymers with a theoretical molecular mass of approximately 10,000 g·mol$^{-1}$ and molar ratios [CO]/[LiTFSI] of 5; 10 and 30, abbreviated "I10PPA2-TFSI5," "I10PPA2-TFSI10" and "I10PPA2-TFSI30," respectively.

The same protocol above is used for the synthesis of a solid polymer electrolyte based on PTMC-PCL polymer with a theoretical molecular mass of approximately 50,000 g·mol$^{-1}$ and a molar ratio [CO]/[LiTFSI] of 15, abbreviated "I50PPA2-TFSI15."

The procedure for preparing solid polymer electrolytes (SPEs) based on PTMC-PCL copolymer using oxalatodigluoroboric acid HTFSI as a catalyst with addition of the lithium salt is shown schematically in FIG. 6.

2.3. Formulation of Hybrid Solid Electrolytes (HSEs) Based on PTMC Using Oxalatodigluoroboric Acid HTFSI as a Catalyst with Addition of the Lithium Salt The protocol below is followed for synthesis by ROP, using the catalyst HTFSI and initiated by a mono-alcohol (3-phenylpropanol, PPA), of PTMC, having a theoretical molecular mass of 10,000 g·mol$^{-1}$ and direct formulation of the electrolyte after synthesis.

The monomer TMC (10.000 g; 97.95 mmol, 96.62 equivalents) is introduced into a round-bottomed two neck 100 mL flask equipped with a magnetic agitator, a condenser and an argon inlet/outlet. DCM (20 mL) is then added to dissolve the TMC. The monomer concentration is approximately 5 M. Once the TMC is completely dissolved, the initiator PPA (136.7 µL, 1.01 mmol, 1 equiv.) is introduced into the reaction medium. Next, the catalyst HTFSI (0.285 g, 1.01 mmol, 1 equiv.) dissolved in 1 mL of DCM is introduced into the reaction medium. The initiator/catalyst molar ratio, abbreviated [PPA]/[HTFSI], is 1. The reaction mixture is mixed for 24-48 hours at ambient temperature.

After this, the LiH (0.0169 g, 2.13 mmol, 2.1 equiv.), 5% in excess with respect to the catalyst and the initiator, is added under vigorous agitation to neutralize the oxalatodigluoroboric acid HTFSI and the OH groups at the PTMC chain terminals. After 12 hours, the salt LiTFSI (1.584 g, 5.52 mmol) is added. The molar ratio of the carbonyl groups of the polymer relative to lithium salt LiTFSI, abbreviated [CO]/[LiTFSI], is 15. Next, the ceramic LATP (7.147 g, approximately 20% by volume with respect to the total volume of the electrolyte) is added and the mixture is mixed using a tubular mixer for 4 hours in order to obtain a homogeneous suspension. The suspension is degassed, coated onto the substrates, and oven-dried at 60° C. for 8 hours, followed by vacuum-drying at 80° C. for at least 72 hours in order to obtain the hybrid solid electrolyte, abbreviated "SI10PPA2-TFSI15-LATP20."

The same protocol above is used for the synthesis of hybrid solid electrolytes based on PTMC polymers with a theoretical molecular mass of approximately 10,000 g·mol$^{-1}$ and molar ratios [CO]/[LiTFSI] of 5; 10 and 30, abbreviated "SI10PPA2-TFSI5-LATP20," "SI10PPA2-TFSI10-LATP20" and "SI10PPA2-TFSI30-LATP20," respectively.

The same protocol above is used for the synthesis of a hybrid solid electrolyte based on a PTMC polymer with a theoretical molecular mass of approximately 50,000 g·mol$^{-1}$ and a molar ratio [CO]/[LiTFSI] of 15, abbreviated "SI50PPA2-TFSI15-LATP20."

The procedure for preparing hybrid solid electrolytes (HSEs) based on PTMC using oxalatodigluoroboric acid HTFSI as a catalyst with addition of the lithium salt is shown schematically in FIG. 7.

2.4. Formulation of Hybrid Solid Electrolytes (HSEs) Based on PTMC-PCL Copolymer Using Oxalatodigluoroboric Acid HTFSI as a Catalyst with Addition of the Lithium Salt The protocol below is followed for synthesis by ROP, using the catalyst HTFSI and initiated by a mono-alcohol (3-phenylpropanol, PPA), of PTMC-PCL copolymer having a theoretical molecular mass of 10,000 g·mol$^{-1}$ and direct formulation of the electrolyte after synthesis.

The monomers TMC (5.702 g; 55.85 mmol, 55.36 equivalents) and CL (4.250 g, 37.23 mmol, 36.91 equiv.) are introduced into a round-bottomed two neck 100 mL flask equipped with a magnetic agitator, a condenser and an argon inlet/outlet. Next, DCM (20 mL) is added to dissolve the TMC. The monomer concentration is approximately 5 M. Once the TMC is completely dissolved, the initiator PPA (136.0 µL, 1.01 mmol, 1 equiv.) is introduced into the reaction medium. Next, the catalyst HTFSI (0.284 g, 1.01 mmol, 1 equiv.) dissolved in 1 mL of DCM is introduced into the same reaction medium. The initiator/catalyst molar ratio, abbreviated [PPA]/[HTFSI], is 1. The reaction mixture is mixed for 24-48 hours at ambient temperature.

After this, the LiH (0.0168 g, 2.12 mmol, 2.1 equiv.), 5% in excess with respect to the catalyst and the initiator, is added under vigorous agitation to neutralize the oxalatodigluoroboric acid HTFSI and the OH groups at the terminals of the copolymer. After 12 hours, the salt LiTFSI (1.492 g, 5.20 mmol) is added. The molar ratio of the carbonyl groups of the polymer relative to lithium salt LiTFSI, abbreviated [CO]/[LiTFSI], is 15. Next, the ceramic LATP (7.101 g, approximately 20% by volume with respect to the total volume of the electrolyte) is added and the mixture is mixed using a tubular mixer for 4 hours in order to obtain a homogeneous suspension. The suspension is degassed, coated onto the substrates, and oven-dried at 60° C. for 8 hours, followed by vacuum-drying at 80° C. for at least 72 hours in order to obtain the hybrid solid electrolyte, abbreviated "I10PPA2-TFSI15-LATP20."

The same protocol above is used for the synthesis of hybrid solid electrolytes based on PTMC-PCL copolymers with a theoretical molecular mass of approximately 10,000 g·mol$^{-1}$ and molar ratios [CO]/[LiTFSI] of 5; 10 and 30, abbreviated "I10PPA2-TFSI5-LATP20," "I10PPA2-TFSI10-LATP20" and "I10PPA2-TFSI30-LATP20," respectively.

The same protocol above is used for the synthesis of a hybrid solid electrolyte based on PTMC-PCL copolymer with a theoretical molecular mass of approximately 50,000 g·mol$^{-1}$ and a molar ratio [CO]/[LiTFSI] of 15, abbreviated "I50PPA2-TFSI15-LATP20."

The procedure for preparing hybrid solid electrolytes (HSEs) based on PTMC-PCL copolymer using oxalatodigluoroboric acid HTFSI as a catalyst with addition of the lithium salt is shown schematically in FIG. 8.

Example 3 (Comparative)

Preparation of a Solid Polymer Electrolyte Based on PTMC Synthesized by ROP Using Sn(Oct)$_2$ as a Catalyst By way of comparison, the protocol below is followed for synthesis by ROP, using the catalyst Sn(Oct)$_2$ and initiated by a mono-alcohol (PPA), of PTMC having a theoretical molecular mass of 10,000 g·mol$^{-1}$ and the preparation of a solid polymer electrolyte based on PTMC obtained with a molar ratio [CO]/[LiTFSI] of 15, abbreviated "Sn10PPA-TFSI15."

3.1. Synthesis of PTMC Using Sn(Oct)$_2$ as a Catalyst

The monomer TMC (10.000 g, 97.95 mmol, 96.62 equivalents), the initiator PPA (136.7 µL, 1.01 mmol, 1 equiv.) and 1 M of solution of the catalyst Sn(Oct)$_2$ dissolved in anhydrous toluene (20.0 µL, 2.0×10$^{-2}$ mmol; 0.02 equiv.) are introduced into a single necked round-bottom 100 mL flask, operating in a glove box filled with argon. The monomer/catalyst molar ratio [TMC]/[Sn(Oct)$_2$] is approximately 5000/1. The flask is closed, removed to the outside and heated to 130° C. by means of an oil bath under vigorous agitation. The temperature of the bath is maintained at 130° C. for 24 hours.

The concentration reaction mixture is then cooled at ambient temperature and a minimal amount of DCM is added to dissolve the PTMC polymer. The polymer solution is then poured into 300 mL of cold methanol under vigorous agitation to precipitate the polymer.

The mass of the polymer, in the form of a white rubber, is washed several times with methanol, then dried in an oven at 60° C. followed by drying in a vacuum at 80° C. for 48 hours in order to obtain the final product, abbreviated "Sn10PPA."

The reaction diagram for the synthesis of PTMC by ROP, using the catalyst Sn(Oct)$_2$ and initiated by PPA, is shown schematically in FIG. 9.

3.2. Preparation of a Solid Polymer Electrolyte Based on PTMC Synthesized by ROP Using Sn(Oct)$_2$ as a Catalyst In a glove box filled with argon, 2.000 g of PTMC, the Sn10PPA synthesized as described in example 3.1, is introduced into a glass receptacle equipped with a magnetic rod and 0.370 g of LiTFSI is added. Next, 10 mL of anhydrous acetone is added, and the mixture is agitated for at least 4 hours in order to obtain a homogeneous solution. The solution is dried at 80° C. for 72 hours in a vacuum in order to obtain the polymer electrolyte, abbreviated Sn10PPA-TFSI15. The molar ratio of the carbonyl groups of the polymer relative to lithium salt, abbreviated [CO]/[Li$^+$], is 15.

Example 4

Preparation of a Composite Electrode Based on (Co)polycarbonate and the Assembly of a Complete Battery The preparation of a composite electrode based on the PTMC polymers and PTMC-PCL copolymers and the assembly of a complete battery are described below.

4.1. Formulation of a Composite Electrode Based on PTMC Using Oxalatodigluoroboric Acid HTFSI as a Catalyst without Adding Lithium Salt The protocol below is followed for synthesis by ROP, using the catalyst HTFSI and initiated by a mono-alcohol (3-phenylpropanol, PPA), of PTMC having a theoretical molecular mass of 10,000 g·mol$^{-1}$ and direct formulation of a composite electrode after synthesis.

The monomer TMC (10.000 g; 97.95 mmol, 96.62 equivalents) is introduced into a round-bottomed two neck 100 mL flask equipped with a magnetic agitator, a condenser and an argon inlet/outlet. DCM (20 mL) is then added to dissolve the TMC. The monomer concentration is approximately 5 M. Once the TMC is completely dissolved, the initiator PPA (136.7 µL, 1.01 mmol, 1 equiv.) is introduced into the reaction medium. Next, the catalyst HTFSI (2.754 g, 9.80 mmol, 9.66 equiv.) dissolved in 5 mL of DCM is introduced into the reaction medium. The monomer/catalyst molar ratio, abbreviated [CO]/[HTFSI], is 10. The reaction mixture is mixed for 24-48 hours at ambient temperature.

Next, LiH (0.0902 g, 11.35 mmol, 11.2 equiv.), 5% in excess with respect to the catalyst and the initiator, is added under vigorous agitation to neutralize the oxalatodigluoroboric acid HTFSI and the OH groups at the PTMC chain terminals. After 12 hours, the reaction medium is dried in a vacuum at ambient temperature for 8 hours to remove the solvent DCM. Next, Li[Ni$_{0.6}$Mn$_{0.2}$Co$_{0.2}$]O$_2$ (NMC622, 64.167 g), PVdF (3.333 g) and carbon black Super P (3.333 g) are added. In the final mixture final, the molar ratio of the carbonyl groups of the polymer relative to lithium salt LiTFSI, abbreviated [CO]/[LiTFSI], is 10. The mass percentages of the different compounds are: PTMC (12%), LiTFSI (3%), NMC622 (77%), PVdF (4%), and Super P (4%). Next, NMP (100 g) is added and the mixture is vigorously agitated at ambient temperature for 24 hours in order to obtain a homogeneous suspension.

The suspension is degassed, applied to the carbon-coated aluminum substrate, and oven-dried at 60° C. for 8 hours, followed by vacuum-drying at 80° C. for at least 72 hours in order to obtain the composite cathode, abbreviated "NMC1."

The procedure for preparing the composite cathode based on PTMC using oxalatodigluoroboric acid HTFSI as a catalyst without adding lithium salt is shown schematically in FIG. 10.

4.2. Formulation of a Composite Electrode Based on PTMC Using Oxalatodigluoroboric Acid HTFSI as a Catalyst with Addition of the Lithium Salt The protocol below is followed for synthesis by ROP, using the catalyst HTFSI and initiated by a mono-alcohol (3-phenylpropanol, PPA), of PTMC having a theoretical molecular mass of 10,000 g·mol$^{-1}$ and direct formulation of a composite electrode after synthesis.

The monomer TMC (10.000 g; 97.95 mmol, 96.62 equivalents) is introduced into a round-bottomed two neck 100 mL flask equipped with a magnetic agitator, a condenser and an argon inlet/outlet. DCM (20 mL) is then added to dissolve the TMC. The monomer concentration is approximately 5 M. Once the TMC is completely dissolved, the initiator PPA (136.7 µL, 1.01 mmol, 1 equiv.) is introduced into the reaction medium. Next, the catalyst HTFSI (0.285 g, 1.01 mmol, 1 equiv.) dissolved in 1 mL of DCM is introduced into the reaction medium. The initiator/catalyst molar ratio, abbreviated [PPA]/[HTFSI], is 1. The reaction mixture is mixed for 24-48 hours at ambient temperature.

After this, LiH (0.0169 g, 2.13 mmol, 2.1 equiv.), 5% in excess with respect to the catalyst and the initiator, is added under vigorous agitation to neutralize the oxalatodigluoroboric acid HTFSI and the OH groups at the PTMC chain terminals. After 12 hours, the reaction medium is dried in a vacuum at ambient temperature for 8 hours to remove the solvent DCM. Next, the salt LiTFSI (2.521 g, 8.78 mmol), Li[Ni$_{0.6}$Mn$_{0.2}$Co$_{0.2}$]O$_2$ (NMC622, 64.167 g), PVdF (3.333 g) and carbon black Super P (3.333 g) are added. In the final mixture, the molar ratio of the carbonyl groups of the polymer relative to lithium salt LiTFSI, abbreviated [CO]/[LiTFSI], is 10. The mass percentages of the different compounds are: PTMC (12%), LiTFSI (3%), NMC622 (77%), PVdF (4%), and Super P (4%). Next, NMP (100 g) is added and the mixture is vigorously agitated at ambient temperature for 24 hours in order to obtain a homogeneous suspension.

The suspension is degassed, applied to the carbon-coated aluminum substrate, and oven-dried at 60° C. for 8 hours, followed by vacuum-drying at 80° C. for at least 72 hours in order to obtain the composite cathode, abbreviated "NMC2."

The procedure for preparing the composite cathode based on PTMC using oxalatodigluoroboric acid HTFSI as a catalyst with addition of the lithium salt is shown schematically in FIG. 11.

4.3. Preparation of a Complete Battery Containing an Electrolyte and a Composite Cathode Based on PTMC and PTMC-PCL Copolymer A polypropylene separator 16 mm in diameter and 60 µm in thickness containing a hole 8 mm in diameter was placed on the NMC electrode (pre-placed on a stainless steel wedge 16 mm in diameter) and an electrolyte pellet approximately 8 mm in diameter prepared as described in examples 1 and 2 was fixed in the hole of the separator. Next, a lithium sheet 14 mm in diameter (glued onto a stainless steel wedge 16 mm in diameter) was placed above the electrolyte. The combination was pressed at 1 ton for 1 second and stacked in a button battery.

The procedure for preparing complete batteries is shown schematically in FIG. 12.

4.4. Preparation of a Complete Battery Containing an Electrolyte and a Composite Cathode Based on PTMC and PTMC-PCL Copolymer by Direct Coating The homogeneous solutions or suspensions of the electrolytes, obtained as described in examples 1 and 2, are coated directly onto the composite cathodes and prepared as described in examples 4.1 and 4.2. The combination electrolyte/cathode is pre-dried for 4 hours at ambient temperature, followed by vacuum-drying at 80° C. for at least 72 hours in order to obtain the electrolyte/cathode assembly. Next, a lithium sheet 14 mm in diameter (glued onto a stainless steel wedge 16 mm in diameter) was placed above the electrolyte/cathode assembly. The combination was pressed at 1 ton for 1 second and stacked in a button battery.

Example 5

Evaluation of the Physicochemical Properties of the Synthesized PTMC, Electrochemical Properties of the Electrolytes and Test on Complete Batteries

5.1. Evaluation of Physicochemical Properties of the Synthesized PTMC

Methods of Characterizing Polymers

NMR spectroscopy: The chemical structure of the monomers and polymers is confirmed by NMR spectroscopy on an NMR spectrometer Bruker Ascend™ 400.

Measurement of molecular mass (Mw): The analyses by SEC-MALS (combination of the techniques of size exclusion chromatography and multi-angle light scattering) are conducted on a Viscotek GPCmax unit (VE 2001 Module) and the data are processed using the software OmniSEC marketed by Malvern Panalytical. The measurements are carried out at ambient temperature and tetrahydrofuran (THF) is used as a solvent with a flow rate of 1 mL·min$^{-1}$. The polymer solutions (at approximately 1 mg·mL$^{-1}$) are filtered through a filter based on PTFE Millipore of 0.20 μm. Calibration is carried out using polystyrene standards.

Thermal properties: DSC measurements (differential scanning calorimetry) are carried out on dry ionomer films using a Chip-DSC 100 system (Linseis) under an argon flow of 50 mL/min with a heating rate of 10° C.min$^{-1}$ from −100 to 100° C. The gas transition temperature (Tg) is determined as the value off the median point in the second scan.

Results

In order to obtain PTMC synthesized by ROP using the catalyst HTFSI for the physicochemical characterizations, polymerizations similar to those described in examples 1.1 (referred to as SI10PPA1) and 2.1 (referred to as SI10PPA2) are conducted. Nevertheless, the reactions are stopped prior to the step of neutralization by LiH and the PTMC is purified by precipitation and washing with methanol, as described in example 3.1. The results of the tests of the PTMC polymers obtained are shown in Table 1 below.

TABLE 1

| Sample | [cat]/[init]$^a$ | Yield (%)$^b$ | $M_{n\text{-}SEC}$ (Da)$^c$ | $M_{w\text{-}SEC}$ (Da)$^c$ | PDI$^d$ |
|---|---|---|---|---|---|
| SnI0PPA (non-invention) | 0.02 | 95 ± 3 | 8700 ± 500 | 21500 ± 3000 | 2.45 ± 0.05 |
| SI10PPA1 | 6.44 | 93 ± 2 | 9100 ± 500 | 14800 ± 1000 | 1.63 ± 0.02 |
| SI10PPA2 | 1.00 | 95 ± 2 | 13600 ± 1000 | 21700 ± 1000 | 1.60 ± 0.03 |

$^a$Molar ratio [catalyst]/[initiator];
$^b$The conversion yield is calculated from the mass of PTMC polymer obtained ($m_{PTMC}$) and the starting mass of the monomer TMC and the initiator PPA, according to the formula yield (%) = $m_{PTMC}$ × 100/($m_{TMC}$ + $m_{PPA}$);
$^c$Average molecular mass is measured by SEC;
$^d$Polydispersity index PDI = $M_w/M_n$.

The $^1$H NMR analyses of the PTMC polymers synthesized by ROP, using the catalyst HTFSI with two different catalyst/initiator molar ratios, initiated by PPA compared to the PTMC synthesized by the catalyst Sn(Oct)$_2$ (Sn10PPA) are shown in FIG. 13.

All of the $^1$H NMR spectra of the polymers synthesized show two main peaks at 4.20 and 2.03 ppm corresponding to the proton of the —CH$_2$—O— and —CH$_2$— groups, respectively, of the TMC unit. In general, the chemical structure of PTMC synthesized by ROP using the catalyst HTFSI is highly similar to that of PTMC synthesized using the catalyst Sn(Oct)$_2$. Nevertheless, the polydispersity index (PDI) of the PTMC synthesized in the invention is lower compared to that of the PTMC synthesized using the catalyst Sn(Oct)$_2$.

5.2. Evaluation of Electrochemical Properties of Solid Electrolytes

Method of Characterizing Electrolytes

Ion Conductivity

Ion conductivity is determined by electrochemical impedance spectroscopy (EIS for "electrochemical impedance spectroscopy" in English) using a VMP3 impedance analyzer (BioLogic) for a range of temperatures from −10° C. to 80° C. by steps of 10° C. The electrolytes are mounted in button batteries under a glove box filled with argon between two blocking electrodes of stainless steel. A separator of PTFE (16 mm in diameter and 60 μm in thickness) comprising a hole 6 mm in diameter is used for fixing the size and shape of the electrolyte. The cells, preconditioned at 55° C. in an oven for 16 hours, are stabilized at a given temperature for 2 hours before each measurement, and the temperature is controlled using a climatic chamber (Vötsch VC4018). The heating and cooling measurements are carried out. The impedance spectra are recorded in a range of frequencies from 1 Hz to 1 MHz. The two modes PEIS ("potentio electrochemical impedance spectroscopy," at controlled applied voltage) and GEIS ("galvano electrochemical impedance spectroscopy," at controlled applied current) are used with an applied voltage or current amplitude of 0.02 V or 30 nA respectively.

The resistance of the electrolyte membrane ($R_{bulk}$) is determined by analyzing and interpreting the Nyquist plot based on the data obtained with the software EC-Lab. The conductivity is calculated using the equation below:

$$\sigma = \frac{L}{R \times S} \qquad \text{[Math 1]}$$

where L represents the thickness of the electrolyte membrane (cm), S is the surface area of the electrode (cm$^2$) and R is the bulk resistance of the membrane (ohm).

Activation energy: The activation energy ($E_a$) is determined by analyzing the conductivity curves with the VTF (Volger-Tammann-Fulcher) equation [9] using a Solver tool.

$$\sigma = Ae^{\frac{-E_a}{R(T-T_0)}} \qquad \text{[Math 2]}$$

where σ represents the ion conductivity (S·cm$^{-1}$), $A=\sigma_0 T^{-0.5}$ is the pre-exponential factor dependent on the temperature (S·cm$^{-1}$), $E_a$ is the activation energy (J·mol$^{-1}$), R=8.314 J mol$^{-1}$. K$^{-1}$ is the universal constant of perfect gases; $T_0=T_g-50$ and T is the temperature in degrees Kelvin (K).

Extrapolation of the curves according to the VTF equation was carried out only on the cooling curves, and the gas transition temperatures (Tg) of the PTMC and the copolymer were fixed at −27° C. ([11], [12]) and −35° C. ([2]) respectively.

Li$^+$ Ion Transport Number

The Li$^+$ ion transport number ($t_+$) is measured at 60° C. by EIS by means of a VMP3 impedance analyzer (BioLogic) on symmetrical Li/electrolyte/Li button cells using the known method of Bruce and Vincent [15]. In particular, $t_+$ is calculated using equation 3 below.

$$t_+ = \frac{I_{SS}(\Delta V - I_0 R_0)}{I_0(\Delta V - I_{SS} R_{SS})} \qquad \text{[Math 3]}$$

where ΔV represents the potential applied across the cell and $I_0$ and $I_{SS}$ are the initial and rest currents, while $R_0$ and $R_{SS}$ are the initial and resting resistances of the stabilizing layers.

Electrochemical Stability

The electrochemical stability of the electrolyte membranes is evaluated by cyclic voltammetry (CV) in a button battery comprising the electrolyte intercalated between a sheet of lithium metal as a counter-electrode and a sheet of copper (Cu) or aluminum coated with carbon (Al@C) as a working electrode. A PP separator as described above is used for fixing the size and shape of the electrolyte.

In order to determine anode stability, Li/SPE/Al@C cells were used. The cells were mounted in a glove box filled with argon and subjected to cyclic voltammetry measurements using a VMP3 (BioLogic) with a scan rate of 0.1 mV.s−1 from 2.8 to 4.5 V and repetition up to 10 cycles. In order to determine cathode stability, Li/SPE/Cu cells were subjected to CV measurements applying a scan rate of 0.1 mV.s$^{-1}$ from 2.0 to −0.5 V and repetition up to 10 cycles.

Results

The ion conductivity ($\sigma$), the transport number of Li$^+$ ions ($t_+$), the conductivity of the ion Li$^+$ and the activation energy ($E_a$) of the different polymer electrolytes based on PTMC synthesized using the catalyst HTFSI and Sn(Oct)$_2$ are shown in Table 2 below.

TABLE 3

| Sample | $\sigma^{a,b}$ (S cm$^{-1}$) | $t_+^b$ | Li$^+$ $\sigma^c$ (S cm$^{-1}$) | $E_a$ (kJ mol$^{-1}$) |
| --- | --- | --- | --- | --- |
| Sn10PPA-TFSI15 (non-invention) | 1.81 × 10$^{-5}$ | 0.70 ± 0.02 | 1.27 × 10$^{-5}$ | 11.25 |
| SI10PPA1-TFSI15 | 4.60 × 10$^{-6}$ | 0.73 ± 0.02 | 3.36 × 10$^{-6}$ | 11.56 |
| SI10PPA2-TFSI15 | 3.77 × 10$^{-6}$ | 0.78 ± 0.03 | 2.94 × 10$^{-6}$ | 13.05 |

$^a$Adjusted values.
$^b$Measured at 60° C.
$^c$Conductivity of Li$^+$ ions obtained by standardizing total ion conductivity with the transport number, $t_+$, of the Li$^+$ ions.

FIG. 14 shows the course of ion conductivity of the electrolytes SI10PPA1-TFSI15 and SI10PPA2-TFSI15 relative to temperature, compared to the electrolyte prepared by the conventional method (Sn10PPA-TFSI15). With the same concentration of the salt LiTFSI, the conductivity of the PTMC synthesized by ROP using the catalyst HTFSI (SI10PPA1-TFSI15 and SI10PPA2-TFSI15) is lower compared to that of the PTMC synthesized using the catalyst Sn(Oct)$_2$ (Sn10PPA-TFSI15). This behavior is assumed to be derived from the higher PDI of the polymer Sn10PPA. The higher PDI value signifies the lower homogeneity of the Mn, which means that there are more polymer molecules with a much smaller Mn (also called oligomers) in the polymer Sn10PPA. These polymer molecules of low molecular mass act as a plasticizer, which increases the segmental mobility of the PTMC chains. However, the Li$^+$ transport number of the SI10PPA1-TFSI15 and SI10PPA2-TFSI15 is higher compared to that of the Sn10PPA-TFSI15. This behavior is assumed to be derived from the stronger interaction between Li$^+$ at the terminal of the polymer protected with the anion TFSI$^-$, which reduces its mobility.

Concerning the impact of the method of preparation, the conductivity of the electrolyte prepared without adding lithium salt (SI10PPA1-TFSI15) is higher than that of the electrolyte prepared with the addition of lithium salt (SI10PPA2-TFSI15), particularly at low temperature. This behavior is assumed to be derived from the slightly higher molecular mass of the SI10PPA2-TFSI15.

FIG. 15 shows the cyclic voltammetry curves of solid electrolytes of the invention (SI10PPA1-TFSI15 and SI10PPA2-TFSI15) compared to that of the electrolyte based on PTMC synthesized by the conventional method (Sn10PPA-TFSI15). The results obtained show that the electrochemical stability of the electrolytes strongly depends on the method of preparation and thus the protection of the OH groups at the terminal of the PTMC chain. In particular, the stability with respect to reduction and oxidation of the electrolytes prepared according to the invention is much higher than that of the electrolyte prepared by the conventional method.

The premier cathode scan carried out on Li/SPE/Cu cells shows much higher stability on contact of the anode with the lithium metal of SI10PPA1-TFSI15 and SI10PPA2-TFSI15, as shown by the appearance of the stripping peak of the lithium at approximately 0.25 V vs. Li/Li$^+$.

The electrochemical stability of the electrolytes with respect to reduction was studied in depth by repeating cyclic voltammetry for six executive cathode scans. FIG. 16 shows the cathodic cyclic voltammetry curves of the solid electrolytes SI10PPA1-TFSI15, SI10PPA2-TFSI15 compared to those of the electrolyte Sn10PPA-TFSI15. For SI10PPA1-TFSI15 and SI10PPA2-TFSI15, the scans are almost superposed from the third scan on. In the case of Sn10PPA-TFSI, the stripping peak of the lithium is missing at approximately 0.25 V vs. Li/Li$^+$ because the lithium deposited on the working electrode reacted with the electrolyte during cycling. In fact, the coulombic cycling efficiency of the SI10PPA1-TFSI15 and SI10PPA2-TFSI15 is approximately 60%, more than two times greater than the efficacy of the Sn10PPA-TFSI15 (approximately 25%).

5.3. Test on Complete Batteries

Methods of Characterizing Complete Batteries

Galvanostatic cycling of Li/NMC622 cells was carried out using an Arbin battery tester using button cells. A discharge/charge rate of 1C corresponds to a specific current of 180 mA g$^{-1}$. The potential limits were set between 2.8 and 4.2 V vs. Li/Li$^+$ and the cells were maintained at a constant temperature of 80° C.

Results

FIG. 17 shows the galvanostatic cycling curves of a complete battery, prepared as described in example 4.3, containing the lithium metal anode (thickness 135 μm), the electrolyte SI10PPA1-TFSI15, prepared without adding lithium salt, as described in example 1.1, and the composite cathode based on SI10PPA2 (referred to as NMC2), prepared with the addition of lithium salt as described in example 4.2.

FIG. 18 shows the galvanostatic cycling curves of a complete battery, prepared as described in example 4.3, containing the lithium metal anode (thickness 135 μm), the electrolyte SI10PPA2-TFSI15, prepared with the addition of lithium salt, as described in example 2.1, and the composite cathode based on SI10PPA2 (referred to as NMC2), prepared with the addition of lithium salt as described in example 4.2.

LIST OF DOCUMENTS CITED

[1] Tominaga et al., Polymer, 2010, 51 (19), 4295-4298;
[2] Wang et al., Coor. Chem. Rev. 2018, 372, 85-100;
[3] Kimura et al., Ionics, 2015, 21 (3), 895-900;
[4] Brandell et al., Solid State Ionics 2014, 262, 738-742;
[5] Mindermark et al., Polymer 63 (2015) 91-98;
[6] Meabe et al., Electrochim. Acta 2017, 237, 259-266;
[7] Zhao et al., Chem. Rev. 2018, 118 (20), 10349-10392;
[8] Rajendra P. Singh, Qichao Hu. Advances in chemistry of hydrogen bis(fluorosulfonyl)imide and its derivatives. Journal of Fluorine Chemistry 226 (2019) 109333;
[9] Gazeau-Bureau et al., Macromolecules 2008, 41 (11), 3782-3784;
[10] Kakuchi et al., Macromolecules 2010, 43 (17), 7090-7094;
[11] Makiguchi et al., J. Polym. Sci. Part A Polym. Chem. 2013, 51 (11), 2455-2463;
[12] Tominaga et al., Electrochim. Acta 2019, 302, 286-290;
[13] Kütt et al., J. Org. Chem. Vol. 76, No. 2, 2011;

[14] Singh et al., Journal of Fluorine Chemistry 226 (2019) 109333;
[15] Tundo et al., Green Chem. 10, 1182-1189 (2008).

The invention claimed is:

1. A process for preparing a solid electrolyte or a composite electrode incorporating a solid electrolyte, suitable for an electrochemical system, the method comprising:
   (i) ring-opening (co) polymerizing, in a solvent medium, a monomer comprising a five- to eight-membered cyclic carbonate and, optionally, a five-to eight-membered lactone, to synthesize a product comprising a (co) polymer in a reaction medium, the ring-opening (co) polymerizing being catalyzed by a catalyst comprising a Brønsted superacid capable of forming, after neutralization in (ii), an ion-conducting alkali metal or alkaline earth metal salt;
   (ii) adding to the reaction medium obtained in (i) a sufficient amount of an alkali metal or alkaline earth metal hydride, to neutralize all of the catalyst and obtain the alkali metal or alkaline earth metal salt, and to protect a terminal hydroxyl group(s) of the (co) polymer(s);
   (iii) optionally adding to a mixture obtained in (ii), an additive comprising an alkali metal or alkaline earth metal salt; and
   (iv) forming a solid electrolyte by evaporation of the solvent medium or a composite electrode incorporating the solid electrolyte.

2. The process of claim 1, wherein the Brønsted superacid catalyst in (i) is bis(trifluoromethanesulfonyl) imide acid (HTFSI), trifluoromethanesulfonic acid (TfOH), bis(fluorosulfonyl) imide acid (HFSI), fluorosulfuric acid ($FSO_3H$), tetrafluoroboric acid ($HBF_4$), hexafluorophosphoric acid ($HPF_6$), hexafluoroarsenic acid ($HAsF_6$), perchloric acid ($HClO_4$), bis(pentafluoroethanesulfonyl)imide acid ($HN(SO_2C_2F_5)_2$), bis(heptafluoropropanesulfonyl)imide acid ($HN(SO_2C_3F_7)_2$), bis(nonafluorobutanesulfonyl)imide acid ($HN(SO_2C_4F_9)_2$), pentafluoroethanesulfonic acid ($C_2F_5SO_3H$), 4,5-dicyano-2-trifluoromethyl-imidazolide acid (HTDI), bis(oxalato)boric acid ($HB(C_2O_4)_2$), difluoro (ethanedioato)boric acid ($HBF_2(C_2O_4)$), tris[(trifluoromethyl)sulfonyl]methane acid ($Tf_3CH$), dicyanamide acid (NH—$(CN)_2$), tricyanomethamide acid (CH—$(CN)_3$), or a mixture thereof.

3. The process of claim 1, wherein the ring-opening (co)polymerizing in (i) is initiated by an initiator comprising a compound comprising a hydroxyl group.

4. The process of claim 1, wherein the ring-opening (co)polymerizing in (i) is carried out at a temperature of less than or equal to 40° C., and/or for a period of less than 3 days.

5. The process of claim 1, wherein the solvent medium comprises an organic solvent.

6. The process of claim 1, wherein the Brønsted superacid catalyst is present in (i) in an amount such that a monomer(s)/catalyst molar ratio is in a range of from 0.5 to 30.

7. The process of claim 1, wherein the Brønsted superacid catalyst is present in (i) in a catalytic amount,
   wherein the adding (iii) is conducted.

8. The process of claim 1, wherein the (co)polymer synthesized in (i) has a molar average molecular mass, Mn, of less than or equal to 200,000 g/mol and/or a polydispersity of less than or equal to 2.5.

9. The process of claim 1, wherein the (co)polymer synthesized in (i) comprises a polytrimethylene carbonate (PTMC), poly(trimethylene carbonate)-poly(ε-caprolactone) (PTMC-PCL) copolymer, or a mixture of two or more of any of these.

10. A process, for preparing a solid electrolyte of solid polymer electrolyte (SPE) or hybrid solid electrolyte (HSE) type, the process comprising, conducting the process of claim 1 and, in the case of formation of an HSE, prior to evaporating the solvent medium, adding to the mixture obtained in (ii) or (iii), an inorganic filler conductive of (an) alkali or alkaline earth metal cation(s).

11. The process of claim 10, wherein the forming (iv) comprises depositing a mixture obtained in (ii) or (iii), optionally supplemented by inorganic filler(s) conductive of (an) alkali or alkaline earth metal cation(s), on a surface of a substrate, to obtain the solid electrolyte.

12. A process of preparing a composite electrode incorporating a solid electrolyte, the process comprising:
   conducting the process of claim 1;
   adding to the mixture obtained in (ii) or (iii), active electrode material(s) and, optionally, electron conductive additive(s) and/or additional binder(s); and
   depositing the mixture on a surface of a current collector, followed by evaporating the solvent medium to obtain the composite electrode.

13. A process of preparing a composite electrode incorporating a solid electrolyte, the process comprising:
   conducting the process of claim 1;
   preparing a dispersion, referred to as "ink," by adding to the solid electrolyte obtained in (iv) after evaporation of the solvent medium, active electrode material(s), optionally electron conductive additive(s) and/or additional binder(s); optionally an additional amount of alkali metal or alkaline earth metal salt(s); and solvent(s) different from the solvent(s) used for the ring-opening (co)polymerizing (i); and
   depositing the ink on a surface of a current collector, followed by evaporation of the solvent(s), to obtain the composite electrode.

14. A solid electrolyte, obtained by the process of claim 10.

15. An electrode composite, comprising:
   a solid electrolyte,
   wherein the electrode obtained by the process of claim 12.

16. A electrode/membrane electrode assembly, wherein the electrode is the composite electrode of claim 15.

17. An electrochemical system, comprising:
   the solid electrolyte of claim 14.

18. The process of claim 1, wherein the alkali metal or alkaline earth metal is lithium.

19. The process of claim 1, wherein the Brønsted superacid catalyst in step (i) is HTFSI, TfOH, HFSI, $FSO_3H$, or a mixture thereof.

20. The electrochemical system of claim 17, which is a lithium battery.

* * * * *